United States Patent
Ren et al.

(10) Patent No.: US 11,902,194 B2
(45) Date of Patent: Feb. 13, 2024

(54) CHANNEL STATE INFORMATION REFERENCE SIGNAL RESOURCE MAPPING

(71) Applicant: Telefonaktiebolaget LM Ericsson (publ), Stockholm (SE)

(72) Inventors: Hong Ren, Kanata (CA); Jianguo Long, Kanata (CA); Yongquan Qiang, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 550 days.

(21) Appl. No.: 17/265,870

(22) PCT Filed: Sep. 17, 2018

(86) PCT No.: PCT/IB2018/057127
§ 371 (c)(1),
(2) Date: Feb. 4, 2021

(87) PCT Pub. No.: WO2020/058743
PCT Pub. Date: Mar. 26, 2020

(65) Prior Publication Data
US 2021/0203464 A1 Jul. 1, 2021

(51) Int. Cl.
*H04L 5/00* (2006.01)
(52) U.S. Cl.
CPC ............ *H04L 5/0048* (2013.01); *H04L 5/001* (2013.01); *H04L 5/0057* (2013.01)
(58) Field of Classification Search
CPC ...... H04L 5/0048; H04L 5/001; H04L 5/0057
USPC .......................................... 370/310, 328, 329
See application file for complete search history.

(56) References Cited

U.S. PATENT DOCUMENTS

| | | | |
|---|---|---|---|
| 9,794,925 B2 | 10/2017 | Han et al. | |
| 2014/0092760 A1 | 4/2014 | Geirhofer et al. | |
| 2015/0280878 A1* | 10/2015 | Lee ...................... | H04L 5/0048 370/252 |
| 2016/0013906 A1 | 1/2016 | Guo et al. | |

(Continued)

OTHER PUBLICATIONS

International Search Report and Written Opinion dated May 23, 2019 issued in PCT Application No. PCT/IB2018/057127, consisting of 15 pages.

(Continued)

*Primary Examiner* — Obaidul Huq
(74) *Attorney, Agent, or Firm* — Sage Patent Group

(57) ABSTRACT

Apparatuses and methods are disclosed for Channel State Information Reference Signal (CSI-RS) resource mapping. According to one embodiment, a method in a network node includes allocating at least one resource for CSI Interference Measurement (CSI-IM) within a predetermined IM region of a Resource Block (RB) of the cell, the predetermined IM region encompassing a plurality of resources of the RB of the cell, the allocated at least one resource being selected from among the plurality of resources of the IM region to reduce a likelihood of overlap with at least one resource allocated for CSI-IM in a neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal (NZP CSI-RS) of the neighboring cell.

33 Claims, 17 Drawing Sheets

(56) References Cited

U.S. PATENT DOCUMENTS

2016/0014778 A1* 1/2016 Zhou .................. H04L 41/0803
370/252
2017/0347270 A1* 11/2017 Iouchi .................. H04L 5/0098
2018/0076873 A1 3/2018 Xiao et al.

OTHER PUBLICATIONS

Ericsson, "On Remaining Details of CSI Measurement"; R1-1720733; 3GPP TSG-RAN WG1 #91, Reno, USA Nov. 27-Dec. 1, 2017; Agenda Item: 7.2.2.1; Document for: Discussion and Decision; consisting of 10 pages.

* cited by examiner

CHANNEL STATE INFORMATION REFERENCE SIGNAL RESOURCE MAPPING

CROSS-REFERENCE TO RELATED APPLICATION

This application is a Submission Under 35 U.S.C. § 371 for U.S. National Stage Patent Application of International Application Number: PCT/IB2018/057127, filed Sep. 17, 2018 entitled "CHANNEL STATE INFORMATION REFERENCE SIGNAL RESOURCE MAPPING," the entirety of which is incorporated herein by reference.

TECHNICAL FIELD

Wireless communication and in particular, Channel State Information (CSI) reference signal resource mapping.

BACKGROUND

The $3^{rd}$ Generation Partnership Project (3GPP) New Radio (NR) standard is currently under discussion and development. As with Long Term Evolution (LTE), Channel State Information (CSI) area will be used. CSI may include the following aspects:
  Define signals that are used for the wireless device (WD), e.g., user equipment (UE) to measure and estimate channel and interference, and to perform time/frequency synchronization;
  Define the resource mapping for the defined signals discussed above;
  Define the channel characteristics to be measured by the WD; and
  Define how channel state information is reported to the access network node (e.g., gNB)
NR specifications introduce a new framework for the WD to measure and report CSI. At least the following WD-specific resources have been defined in the NR CSI framework:
  Non-Zero-Power CSI Reference Signal (NZP CSI-RS) resources: These resources may be used for channel and interference measurement. When used for interference measurement, these resources may be used to measure intra-cell interference, or interference in Multi-User Multiple Inputs Multiple Outputs (MU-MIMO). A special type of NZP CSI-RS is the CSI-RS for tracking, which can be used for fine time and frequency synchronization. In this disclosure, this signal is referred to as "Tracking RS" or "TRS". These NZP CSI-RS resources can be periodic or aperiodic (the TRS can only be periodic). For a periodic resource, a period and a slot offset may be specified. The number of resource elements (REs) in a CSI-RS resource can be determined by the number and density of CSI-RS ports, and the resource(s) can be mapped to a specific location within a resource block (RB);
  Zero-Power CSI-RS (ZP CSI-RS) resources: These resources may be used for rate matching for the Physical Downlink Shared Channel (PDSCH); and
  CSI Interference Measurement (CSI-IM) resources: These are normally used to measure inter-cell interference. Each CSI-IM resource may have 4 Resource Elements (REs), and can have a pattern of 4×1 (i.e., 4 consecutive REs in an Orthogonal Frequency Division Multiplexing (OFDM) symbol), or a pattern of 2×2 (i.e., 2 consecutive OFDM symbols, with 2 REs on each symbol).

However, existing specifications and the resources defined by these specifications do not establish processes and arrangements for CSI-RS resource mapping to lessen or minimize the impact on channel and interference measurements due to inter-cell interference.

SUMMARY

Some embodiments of this disclosure advantageously provide methods and apparatuses for CSI-RS resource mapping that may lessen or minimize the impact on channel and interference measurements due to inter-cell interference as compared with known implementations.

According to one aspect, a network node for serving a cell in a wireless network with at least one neighboring cell is provided. The network node includes processing circuitry configured to cause the network node to allocate at least one resource for Channel State Information Interference Measurement, CSI-IM, within a predetermined IM region of a Resource Block, RB, of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell.

In some embodiments of this aspect, the processing circuitry is further configured to identify the at least one resource for the CSI-IM within the predetermined IM region of the RB of the cell based at least in part on an identifier of the cell. In some embodiments of this aspect, the processing circuitry is further configured to cause the network node to select at least one resource for Non-Zero Power, NZP, Channel State Information Reference Signal, CSI-RS, in a predetermined Reference Signal, RS, region of the RB of the cell, the predetermined RS region of the RB not overlapping with the predetermined IM region of the RB; and transmit the NZP CSI-RS on the selected at least one resource. In some embodiments of this aspect, the predetermined IM region of the RB is a dedicated region for at least one CSI-IM resource, the dedicated region not comprising any NZP CSI-RS resources. In some embodiments of this aspect, the predetermined RS region is a region of the RB configured for at least one CSI-RS resource, the predetermined RS region not comprising any CSI-IM resources.

In some embodiments of this aspect, the processing circuitry is further configured to cause the network node to determine a slot offset for the CSI-IM based on a cell identifier, ID, of the cell being served by the network node. In some embodiments of this aspect, the processing circuitry is further configured to cause the network node to determine a period for the CSI-IM, the period for the CSI-IM being common to a group of cells, the group of cells including at least the cell and the neighboring cell. In some embodiments of this aspect, the CSI-IM is mapped to the at least one resource of the predetermined IM region according to the determined period for the CSI-IM and the determined slot offset. In some embodiments of this aspect, the CSI-IM is mapped to the at least one resource of the predetermined IM region according to a random selection algorithm. In some embodiments of this aspect, the processing circuitry is further configured to cause the network node to allocate at least one resource for Non-Zero Power, NZP, Channel State Information Reference Signal, CSI-RS, to at least partially overlap with at least one NZP CSI-RS resource of the neighboring cell. In some embodiments of this aspect, the processing circuitry is further configured to cause the network node to determine a period and a slot offset for the at least one NZP CSI-RS that is the same as a period and a slot offset for the at least one NPZ CSI-RS associated with the neighboring cell.

In some embodiments of this aspect, the processing circuitry is further configured to cause the network node to transmit at least one Tracking Reference Signal, TRS, to at least partially overlap with at least one TRS of the neighboring cell. In some embodiments of this aspect, the processing circuitry is further configured to cause the network node to determine a period and a slot offset for at least one Tracking Reference Signal, TRS, that is the same as a period and a slot offset for at least one TRS associated with the neighboring cell; and transmit the at least one TRS according to the determined period and the determined slot offset. In some embodiments of this aspect, the processing circuitry is further configured to cause the network node to transmit at least one Tracking Reference Signal, TRS, in a fixed time domain location, the fixed time domain location being the same as a fixed time domain location of the neighboring cell. In some embodiments of this aspect, the processing circuitry is further configured to cause the network node to configure Tracking Reference Signal, TRS, resources in the RB of the cell by, for each TRS symbol in the RB, dividing a plurality of subcarriers into at least four sets of subcarriers, each of the at least four sets of subcarriers corresponding to a TRS power level that is different from a TRS power level of the other of the at least four sets of subcarriers. In some embodiments of this aspect, the at least four sets of subcarriers comprise a first set of subcarriers that is assigned for transmitting TRS at a regular TRS power level; a second set of subcarriers that is assigned for transmitting TRS at a power level that is 3 decibels, dB, higher than the regular TRS power level; a third set of subcarriers that is assigned for transmitting TRS at a power level that is 4.8 dB higher than the regular TRS power level; and a fourth set of subcarriers that is assigned for transmitting TRS at a power level that is 6 dB higher than the regular TRS power level. In some embodiments of this aspect, TRS resources associated with the neighboring cell are also configured with the at least four sets of subcarriers for aligning Tracking Reference Signals, TRSs, of the same power level on the same set of the at least four sets of subcarriers. In some embodiments of this aspect, the processing circuitry is further configured to cause the network node to transmit at least one TRS on one of the at least four sets of subcarriers; and if the at least one TRS is transmitted on one of the second set, the third set and the fourth set of subcarriers, transmit a Zero-Power, ZP, Channel State Information Reference Signal, CSI-RS, on at least the first set of subcarriers.

According to another aspect, a method in a network node for serving a cell in a wireless network with at least one neighboring cell is provided. The method including allocating at least one resource for Channel State Information Interference Measurement, CSI-IM, within a predetermined IM region of a Resource Block, RB, of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell.

In some embodiments of this aspect, the method further includes identifying the at least one resource for the CSI-IM within the predetermined IM region of the TTI of the cell based at least in part on an identifier of the cell. In some embodiments of this aspect, the process further includes selecting at least one resource for Non-Zero Power, NZP, Channel State Information Reference Signal, CSI-RS, in a predetermined Reference Signal, RS, region of the TTI of the cell, the predetermined RS region of the RB not overlapping with the predetermined IM region of the TTI; and transmitting the NZP CSI-RS on the selected at least one resource. In some embodiments of this aspect, the predetermined IM region of the RB of the cell is a dedicated region for at least one CSI-IM resource, the dedicated region not comprising any NZP CSI-RS resources. In some embodiments of this aspect, the predetermined RS region is a region of the RB of the cell configured for at least one CSI-RS resource, the predetermined RS region not comprising any CSI-IM resources.

In some embodiments of this aspect, the process further includes determining a slot offset for the CSI-IM based on a cell identifier, ID, of the cell being served by the network node. In some embodiments of this aspect, the method further includes determining a period for the CSI-IM, the period for the CSI-IM being common to a group of cells, the group of cells including at least the cell and the neighboring cell. In some embodiments of this aspect, the CSI-IM is mapped to the at least one resource of the predetermined IM region according to the determined period for the CSI-IM and the determined slot offset. In some embodiments of this aspect, wherein the CSI-IM is mapped to the at least one resource of the predetermined IM region according to a random selection algorithm. In some embodiments of this aspect, the method further includes allocating at least one resource for Non-Zero Power, NZP, Channel State Information Reference Signal, CSI-RS, to at least partially overlap with at least one NZP CSI-RS resource of the neighboring cell. In some embodiments of this aspect, the process further includes determining a period and a slot offset for the at least one NZP CSI-RS that is the same as a period and a slot offset for the at least one NPZ CSI-RS associated with the neighboring cell.

In some embodiments of this aspect, the method further includes transmitting at least one Tracking Reference Signal, TRS, to at least partially overlap with at least one TRS of the neighboring cell. In some embodiments of this aspect, the method further includes determining a period and a slot offset for at least one Tracking Reference Signal, TRS, that is the same as a period and a slot offset for at least one TRS associated with the neighboring cell; and transmitting the at least one TRS according to the determined period and the determined slot offset. In some embodiments of this aspect, the method further includes transmitting at least one Tracking Reference Signal, TRS, in a fixed time domain location, the fixed time domain location being the same as a fixed time domain location of the neighboring cell. In some embodiments of this aspect, the method further includes configuring Tracking Reference Signal, TRS, resources in the RB of the cell by, for each TRS symbol in the RB, dividing a plurality of subcarriers into at least four sets of subcarriers, each of the at least four sets of subcarriers corresponding to a TRS power level that is different from a TRS power level of the other of the at least four sets of subcarriers. In some embodiments of this aspect, the at least four sets of subcarriers comprise: a first set of subcarriers that is assigned for transmitting TRS at a regular TRS power level, a second set of subcarriers that is assigned for transmitting TRS at a power level that is 3 decibels, dB, higher than the regular TRS power level, a third set of subcarriers that is assigned for transmitting TRS at a power level that is 4.8 dB higher than the regular TRS power level, and a fourth set of subcarriers that is assigned for transmitting TRS at a power level that is 6 dB higher than the regular TRS power level. In some embodiments of this aspect, TRS resources associated with the neighboring cell are also configured with the at least four sets of subcarriers for aligning Tracking Reference Signals, TRSs, of the same power level on the same set of the at least four sets of subcarriers. In some embodiments of this aspect, the method further includes transmitting at least one TRS on one of the at least four sets of subcarriers; and if the at least one TRS is transmitted on one of the second set, the third set and the fourth set of subcarriers, transmitting a Zero-Power, ZP, Channel State Information Reference Signal, CSI-RS, on at least the first set of subcarriers.

According to yet another aspect of this disclosure, a wireless device, WD, for communicating with a network node serving a cell in a wireless network with at least one neighboring cell is provided. The WD includes processing circuitry configured to cause the WD to receive a signal on at least one resource for Channel State Information Interference Measurement, CSI-IM, the at least one resource for CSI-IM being allocated within a predetermined IM region of a Resource Block, RB, of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell; and transmit a Channel State Information, CSI, report, the CSI report based at least in part on inter-cell interference measured on the at least one resource for the CSI-IM of the cell.

In some embodiments of this aspect, the processing circuitry is further configured to receive at least one Non-Zero Power, NZP, Channel State Information Reference Signal, CSI-RS, in a predetermined Reference Signal, RS, region of the RB of the cell, the predetermined RS region of the RB not overlapping with the predetermined IM region of the RB. In some embodiments of this aspect, the predetermined IM region of the RB of the cell is a dedicated region for at least one CSI-IM resource, the dedicated region not comprising any NZP CSI-RS resources. In some embodiments of this aspect, the predetermined RS region is a region of the RB of the cell configured for at least one CSI-RS resource, the predetermined RS region not comprising any CSI-IM resources. In some embodiments of this aspect, the CSI-IM is mapped to the at least one resource of the predetermined IM region according to at least a slot offset, the slot offset based at least in part on a cell identifier, ID. In some embodiments of this aspect, the CSI-IM is mapped to the at least one resource of the predetermined IM region according to a random selection algorithm. In some embodiments of this aspect, the processing circuitry is further configured to cause the WD to receive at least one Non-Zero Power, NZP, Channel State Information Reference Signal, CSI-RS, that at least partially overlaps with at least one NZP CSI-RS of at least a neighboring cell.

In some embodiments of this aspect, a period and a slot offset for the received at least one NZP CSI-RS is the same as a period and a slot offset for the at least one NPZ CSI-RS associated with the neighboring cell. In some embodiments of this aspect, the processing circuitry is further configured to cause the WD to receive at least one Tracking Reference Signal, TRS, that at least partially overlaps with at least one TRS of a neighboring cell. In some embodiments of this aspect, a period and a slot offset for the at least one TRS is the same as a period and a slot offset for the at least one TRS of the neighboring cell. In some embodiments of this aspect, the received at least one TRS is in a fixed time domain location, the fixed time domain location being the same as a fixed time domain location of the neighboring cell. In some embodiments of this aspect, the processing circuitry is further configured to cause the WD to receive at least one Tracking Reference Signal, TRS, on one of at least four sets of subcarriers in the RB, the at least four sets of subcarriers comprising a first set of subcarriers that is assigned for transmitting TRS at a regular TRS power level, a second set of subcarriers that is assigned for transmitting TRS at a power level that is 3 decibels, dB, higher than the regular TRS power level, a third set of subcarriers that is assigned for transmitting TRS at a power level that is 4.8 dB higher than the regular TRS power level, and a fourth set of subcarriers that is assigned for transmitting TRS at a power level that is 6 dB higher than the regular TRS power level. In some embodiments of this aspect, the processing circuitry is further configured to cause the WD to receive the at least one TRS on one of the at least four sets of subcarriers; and if the at least one TRS is transmitted on one of the second set, the third set and the fourth set of subcarriers, receive a Zero-Power, ZP, Channel State Information Reference Signal, CSI-RS, on at least the first set of subcarriers.

According to another aspect of this disclosure, a method in a wireless device, WD, for communicating with a network node serving a cell in a wireless network with at least one neighboring cell is provided. The method includes receiving a signal on at least one resource for Channel State Information Interference Measurement, CSI-IM, the at least one resource for CSI-IM being allocated within a predetermined IM region of a Resource Block, RB, of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell; and transmitting a Channel State Information, CSI, report, the CSI report based at least in part on inter-cell interference measured on the at least one resource for the CSI-IM of the cell.

In some embodiments of this aspect, the method further includes receiving at least one Non-Zero Power, NZP, Channel State Information Reference Signal, CSI-RS, in a predetermined Reference Signal, RS, region of the RB of the cell, the predetermined RS region of the RB not overlapping with the predetermined IM region of the RB. In some embodiments of this aspect, the predetermined IM region of the RB of the cell is a dedicated region for at least one CSI-IM resource, the dedicated region not comprising any NZP CSI-RS resources. In some embodiments of this aspect, the predetermined RS region is a region of the RB of the cell configured for at least one CSI-RS resource, the predetermined RS region not comprising any CSI-IM resources. In some embodiments of this aspect, the CSI-IM is mapped to the at least one resource of the predetermined IM region according to at least a slot offset, the slot offset based at least in part on a cell identifier, ID. In some embodiments of this aspect, the CSI-IM is mapped to the at least one resource of the predetermined IM region according to a random selection algorithm. In some embodiments of this aspect, the method further includes receiving at least one Non-Zero Power, NZP, Channel State Information Reference Signal, CSI-RS, that at least partially overlaps with at least one NZP CSI-RS of at least a neighboring cell.

In some embodiments of this aspect, a period and a slot offset for the received at least one NZP CSI-RS is the same as a period and a slot offset for the at least one NPZ CSI-RS associated with the neighboring cell. In some embodiments of this aspect, the method further includes receiving at least one Tracking Reference Signal, TRS, that at least partially overlaps with at least one TRS of a neighboring cell. In some embodiments of this aspect, a period and a slot offset for the at least one TRS is the same as a period and a slot offset for the at least one TRS of the neighboring cell. In some embodiments of this aspect, the received TRS is in a fixed time domain location, the fixed time domain location being the same as a fixed time domain location of the neighboring cell. In some embodiments of this aspect, the method further includes receiving at least one Tracking Reference Signal, TRS, on one of at least four sets of subcarriers in the RB, the at least four sets of subcarriers including a first set of subcarriers that is assigned for transmitting TRS at a regular TRS power level, a second set of subcarriers that is assigned for transmitting TRS at a power level that is 3 decibels, dB, higher than the regular TRS power level, a third set of subcarriers that is assigned for transmitting TRS at a power level that is 4.8 dB higher than the regular TRS power level, and a fourth set of subcarriers that is assigned for transmitting TRS at a power level that is 6 dB higher than the regular TRS power level. In some embodiments of this aspect, the method further includes receiving the at least one TRS on one of the at least four sets of subcarriers; and if the at least one TRS is transmitted on one of the second set, the third set and the fourth set of subcarriers, receiving a Zero-Power, ZP, Channel State Information Reference Signal, CSI-RS, on at least the first set of subcarriers.

According to yet another aspect of this disclosure, a computer program, program product or computer readable storage medium is provided that includes instructions which when executed on at least one processor of a network node perform any one of the methods of the network node.

According to another aspect of this disclosure, a computer program, program product or computer readable storage medium is provided that includes instructions which when executed on at least one processor of a wireless device perform any one of the methods of the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
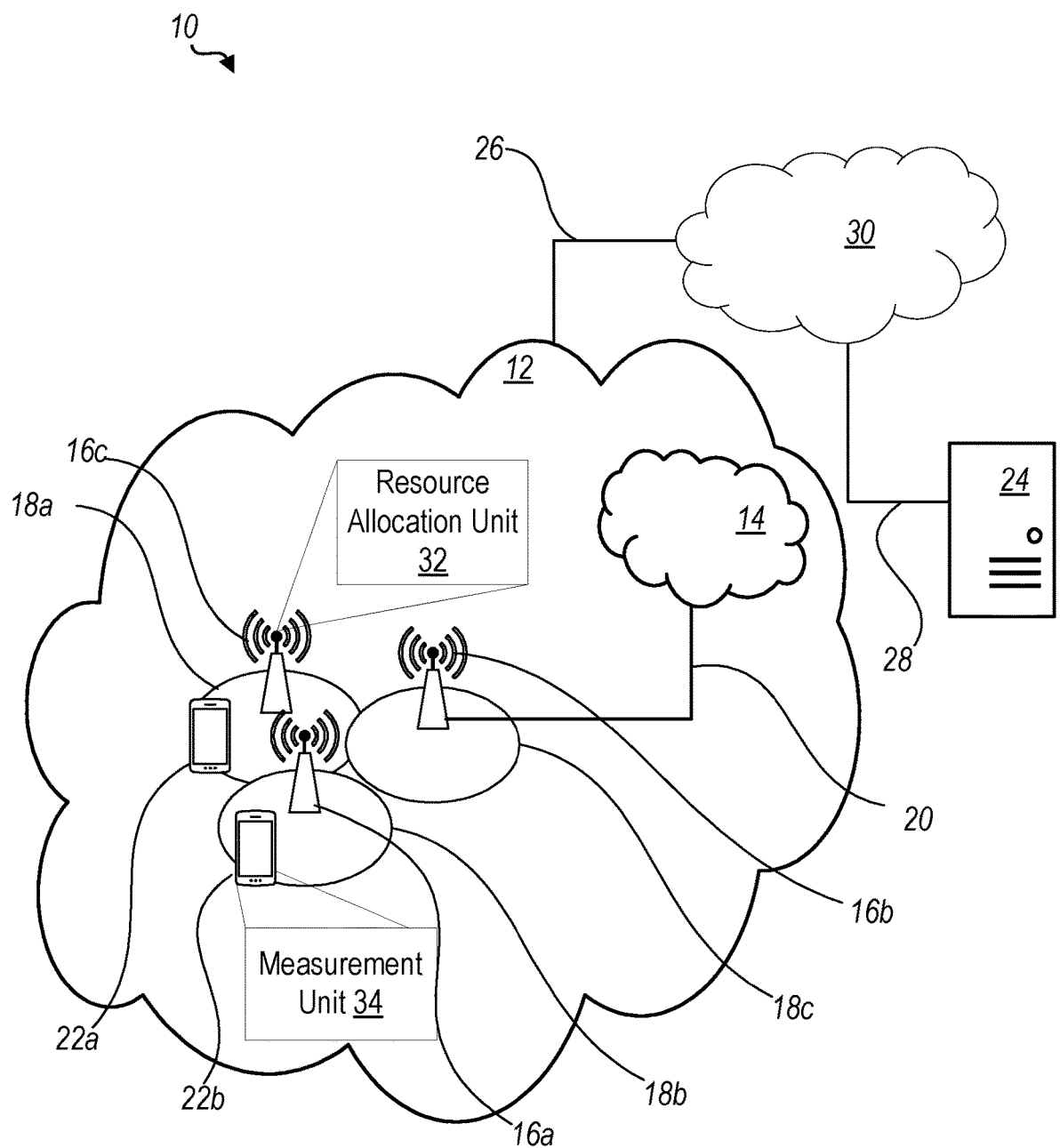
FIG. 1 is a schematic diagram of an example network architecture illustrating a communication system connected via an intermediate network to a host computer according to the principles in the present disclosure.

Resource mapping can affect the performance of a network. With improper resource mapping, user and cell performance degradation may occur. For example, when a WD's CSI-IM resource collides with CSI-IM resources of a neighbor cell, the inter-cell interference may be underestimated. In this case, the Channel Quality Indicator (CQI) values reported by the WD may be overly optimistic. This can cause an aggressive link adaptation and a high error rate, and can eventually reduce the user's throughput.

Accordingly, some embodiments of this disclosure provide for CSI-RS resource mapping that may advantageously minimize/reduce the impact on channel and interference measurements due to e.g., inter-cell interference.

Some embodiments of this disclosure allow WDs to perform channel and interference measurements more accurately, as compared to existing resource mapping techniques, which can be a foundation for improving user throughput.

Some embodiments of this disclosure are based on an ideal condition or neighbor cell resource allocation in which there is:
  no overlap between one cell's CSI-IM with the neighbor cell's NZP CSI-RS; and/or
  no overlap between one cell's CSI-IM with the neighbor cell's CSI-IM.

With some existing techniques, a slot offset may be assigned for one cell's CSI-IM, and a network node may attempt to make the slot offset different from those used for CSI-IM by neighbor cells. Furthermore, a different slot offset may be used for NZP CSI-RS for the cell, and this offset may be different from the offsets used for NZP CSI-RS of the neighbor cells. Some problems with this technique may include:
  difficulty in managing multiple sets of slot offsets; and
  very difficult to eliminate any type of overlap (between CSI-IM and NZP CSI-RS, or between CSI-IM and CSI-IM).

Accordingly, the principles of this disclosure are provided to create a simpler and/or more efficient solution for reference signal resource allocation, as compared to existing techniques. Thus, some advantages of this disclosure include one or more of the following:
  simplicity: a network node may only be required to try (e.g., reduce a likelihood of overlap) to make the CSI-IM offsets different between neighbor cells;
  overlap between one cell's CSI-IM with the neighbor cell's NZP CSI-RS may be completely eliminated;
  with only one set of offsets, the probability of offset colliding between neighbor cells is smaller/reduced as compared to when each cell has more than one offset to manage; and
  in addition to the slot offset, there are multiple resources in the IM region, which further reduces the probability of CSI-IM resource overlapping in neighboring cells.

Before describing in detail example embodiments, it is noted that the embodiments reside primarily in combinations of apparatus components and processing steps related to CSI-RS resource mapping. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

In some embodiments, the term "resource" is used in a general way. It may indicate any radio resource, such as, a Resource Element (RE), or, in some embodiments, a combination of subcarriers, time slots, symbols, codes and/or spatial dimensions. In some embodiments, the "resource" may indicate a frequency and/or time resource associated with radio communications. Non-limiting examples of time resources include symbol, time slot, subframe, radio frame, TTI, interleaving time, etc.

A RE may represent a smallest time-frequency resource, e.g. representing the time and frequency range covered by one symbol or a number of bits represented in a common modulation. A RE may e.g. cover a symbol time length and a subcarrier, in particular in 3GPP, NR and/or LTE standards.

A cell may be generally a communication cell, e.g., of a cellular or mobile communication network, provided by a node, such as a network node. A serving cell may be a cell on or via which a network node (the node providing or associated to the cell, e.g., base station or eNodeB) transmits and/or may transmit data (which may be data other than broadcast data) to a WD, in particular control, configuration, allocation and/or user or payload data, and/or via or on which a WD transmits and/or may transmit data to the node. A serving cell may be a cell for or on which the WD is configured and/or to which it is synchronized and/or has performed an access procedure, e.g., a random access procedure, and/or in relation to which it is in a RRC_connected or RRC_idle state, e.g., in case the network node and/or WD and/or network follow the a standard such as LTE and/or NR. One or more carriers (e.g., uplink and/or downlink carrier/s and/or a carrier for both uplink and downlink) may be associated to a cell.

In some embodiments, a neighboring cell is a cell that may or can be expected to cause inter-cell interference with another cell and which inter-cell interference may affect network performance.

In some embodiments, the allocation of resources for one or more WDs in a cell may be performed by the network node. In some embodiments, the resources that are allocated by the network node are for the one or more WDs to perform measurements on, which measurements can be used for channel state information. In some embodiments, a set of resources, such as, a Resource Block (RB), a Transmission Time Interval (TTI) or a subframe, may be divided into one or more regions dedicated/predetermined for specific reference signals (e.g., CSI-RS, CSI-IM, etc.) and/or channels. In some embodiments, the allocation of reference signal resources (e.g., CSI-RS, CSI-IM, etc.) for a cell may include the network node 16 selecting or determining which subset of resources in a predetermined/dedicated region should be used by the WD to perform measurements on. In some embodiments, the network node may select or determine such resources according to the principles in this disclosure to e.g., reduce the impact on channel and interference measurement due to inter-cell interference caused by neighboring cells. It is also noted that any two or more embodiments described in this disclosure may be combined in any way with each other. In the present disclosure, the terms Resource Block (RB), Transmission Time Interval (TTI) and subframe may be used interchangeably.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Returning to the drawing figures, in which like elements are referred to by like reference numerals, there is shown in FIG. 1 a schematic diagram of an example communication system 10 according to an embodiment of the present disclosure. Communication system 10 may be a 3GPP-type cellular network that may support standards such as LTE and/or NR (5G), and which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a resource allocation unit 32 which is configured to cause the network node 16 to allocate at least one resource for Channel State Information Interference Measurement, CSI-IM, within a predetermined IM region of a Resource Block, RB (or, equivalently, a Transmit Time Interval, TTI), of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell.

A wireless device 22 is configured to include a measurement unit 34 which is configured to cause the WD 22 to receive a signal on at least one resource for Channel State Information Interference Measurement, CSI-IM, the at least one resource for CSI-IM being allocated within a predetermined IM region of Resource Block, RB, (or, equivalently, a Transmit Time Interval, TTI), of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell; and to transmit a Channel State Information, CSI, report, the CSI report based at least in part on inter-cell interference measured on the at least one resource for the CSI-IM of the cell.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include resource allocation unit 32 configured to cause the network node to 16 to allocate at least one resource for Channel State Information Interference Measurement, CSI-IM, within a predetermined IM region of a Resource Block, RB (or, equivalently, a Transmit Time Interval, TTI), of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell.

In some embodiments, the processing circuitry 68 is further configured to identify the at least one resource for the CSI-IM within the predetermined IM region of the RB of the cell based at least in part on an identifier of the cell. In some embodiments, the processing circuitry 68 is further configured to cause the network node 16 to select at least one resource for Non-Zero Power, NZP, Channel State Information Reference Signal, CSI-RS, in a predetermined Reference Signal, RS, region of the RB of the cell, the predetermined RS region of the RB not overlapping with the predetermined IM region of the RB; and transmit the NZP CSI-RS on the selected at least one resource. In some embodiments, the predetermined IM region of the RB is a dedicated region for at least one CSI-IM resource, the dedicated region not comprising any NZP CSI-RS resources. In some embodiments, the predetermined RS region is a region of the RB configured for at least one CSI-RS resource, the predetermined RS region not comprising any CSI-IM resources. In some embodiments, the processing circuitry 68 is further configured to cause the network node 16 to determine a slot offset for the CSI-IM based on a cell identifier, ID, of the cell being served by the network node 16.

In some embodiments, the processing circuitry 68 is further configured to cause the network node 16 to determine a period for the CSI-IM, the period for the CSI-IM being common to a group of cells, the group of cells including at least the cell and the neighboring cell. In some embodiments, the CSI-IM is mapped to the at least one resource of the predetermined IM region according to the determined period for the CSI-IM and the determined slot offset. In some embodiments, the CSI-IM is mapped to the at least one resource of the predetermined IM region according to a random selection algorithm. In some embodiments, the processing circuitry 68 is further configured to cause the network node 16 to allocate at least one resource for Non-Zero Power, NZP, Channel State Information Reference Signal, CSI-RS, to at least partially overlap with at least one NZP CSI-RS resource of the neighboring cell. In some embodiments, the processing circuitry 68 is further configured to cause the network node 16 to determine a period and a slot offset for the at least one NZP CSI-RS that is the same as a period and a slot offset for the at least one NPZ CSI-RS associated with the neighboring cell. In some embodiments, the processing circuitry 68 is further configured to cause the network node 16 to transmit at least one Tracking Reference Signal, TRS, to at least partially overlap with at least one TRS of the neighboring cell. In some embodiments, the processing circuitry 68 is further configured to cause the network node 16 to determine a period and a slot offset for at least one Tracking Reference Signal, TRS, that is the same as a period and a slot offset for at least one TRS associated with the neighboring cell; and transmit the at least one TRS according to the determined period and the determined slot offset. In some embodiments, the processing circuitry 68 is further configured to cause the network node 16 to transmit at least one Tracking Reference Signal, TRS, in a fixed time domain location, the fixed time domain location being the same as a fixed time domain location of the neighboring cell.

In some embodiments, the processing circuitry 68 is further configured to cause the network node 16 to configure Tracking Reference Signal, TRS, resources in the RB of the cell by, for each TRS symbol in the RB, dividing a plurality of subcarriers into at least four sets of subcarriers, each of the at least four sets of subcarriers corresponding to a TRS power level that is different from a TRS power level of the other of the at least four sets of subcarriers. In some embodiments, the at least four sets of subcarriers include a first set of subcarriers that is assigned for transmitting TRS at a regular TRS power level; a second set of subcarriers that is assigned for transmitting TRS at a power level that is 3 decibels, dB, higher than the regular TRS power level; a third set of subcarriers that is assigned for transmitting TRS at a power level that is 4.8 dB higher than the regular TRS power level; and a fourth set of subcarriers that is assigned for transmitting TRS at a power level that is 6 dB higher than the regular TRS power level. In some embodiments, TRS resources associated with the neighboring cell are also configured with the at least four sets of subcarriers for aligning Tracking Reference Signals, TRSs, of the same power level on the same set of the at least four sets of subcarriers. In some embodiments, the processing circuitry 68 is further configured to cause the network node 16 to transmit at least one TRS on one of the at least four sets of subcarriers; and if the at least one TRS is transmitted on one of the second set, the third set and the fourth set of subcarriers, transmit a Zero-Power, ZP, Channel State Information Reference Signal, CSI-RS, on at least the first set of subcarriers.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by the WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a measurement unit 34 configured to cause the WD 22 to receive a signal on at least one resource for Channel State Information Interference Measurement, CSI-IM, the at least one resource for CSI-IM being allocated within a predetermined IM region of a Resource Block, RB (or, equivalently, a Transmit Time Interval, TTI), of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell; and transmit a Channel State Information, CSI, report, the CSI report based at least in part on inter-cell interference measured on the at least one resource for the CSI-IM of the cell.

In some embodiments, the processing circuitry 84 is further configured to receive at least one Non-Zero Power, NZP, Channel State Information Reference Signal, CSI-RS, in a predetermined Reference Signal, RS, region of the RB of the cell, the predetermined RS region of the RB not overlapping with the predetermined IM region of the RB. In some embodiments, the predetermined IM region of the RB of the cell is a dedicated region for at least one CSI-IM resource, the dedicated region not comprising any NZP CSI-RS resources. In some embodiments, the predetermined RS region is a region of the RB of the cell configured for at least one CSI-RS resource, the predetermined RS region not comprising any CSI-IM resources. In some embodiments, the CSI-IM is mapped to the at least one resource of the predetermined IM region according to at least a slot offset, the slot offset based at least in part on a cell identifier, ID. In some embodiments, the CSI-IM is mapped to the at least one resource of the predetermined IM region according to a random selection algorithm.

In some embodiments, the processing circuitry 84 is further configured to cause the WD 22 to receive at least one Non-Zero Power, NZP, Channel State Information Reference Signal, CSI-RS, that at least partially overlaps with at least one NZP CSI-RS of at least a neighboring cell. In some embodiments, a period and a slot offset for the received at least one NZP CSI-RS is the same as a period and a slot offset for the at least one NPZ CSI-RS associated with the neighboring cell. In some embodiments, the processing circuitry 84 is further configured to cause the WD 22 to receive at least one Tracking Reference Signal, TRS, that at least partially overlaps with at least one TRS of a neighboring cell. In some embodiments, a period and a slot offset for the at least one TRS is the same as a period and a slot offset for the at least one TRS of the neighboring cell. In some embodiments, the received at least one TRS is in a fixed time domain location, the fixed time domain location being the same as a fixed time domain location of the neighboring cell. In some embodiments, the processing circuitry 84 is further configured to cause the WD 22 to receive at least one Tracking Reference Signal, TRS, on one of at least four sets of subcarriers in the RB, the at least four sets of subcarriers including a first set of subcarriers that is assigned for transmitting TRS at a regular TRS power level, a second set of subcarriers that is assigned for transmitting TRS at a power level that is 3 decibels, dB, higher than the regular TRS power level, a third set of subcarriers that is assigned for transmitting TRS at a power level that is 4.8 dB higher than the regular TRS power level, and a fourth set of subcarriers that is assigned for transmitting TRS at a power level that is 6 dB higher than the regular TRS power level. In some embodiments, the processing circuitry 84 is further configured to cause the WD 22 to receive the at least one TRS on one of the at least four sets of subcarriers; and if the at least one TRS is transmitted on one of the second set, the third set and the fourth set of subcarriers, receive a Zero-Power, ZP, Channel State Information Reference Signal, CSI-RS, on at least the first set of subcarriers.

Figure 2:
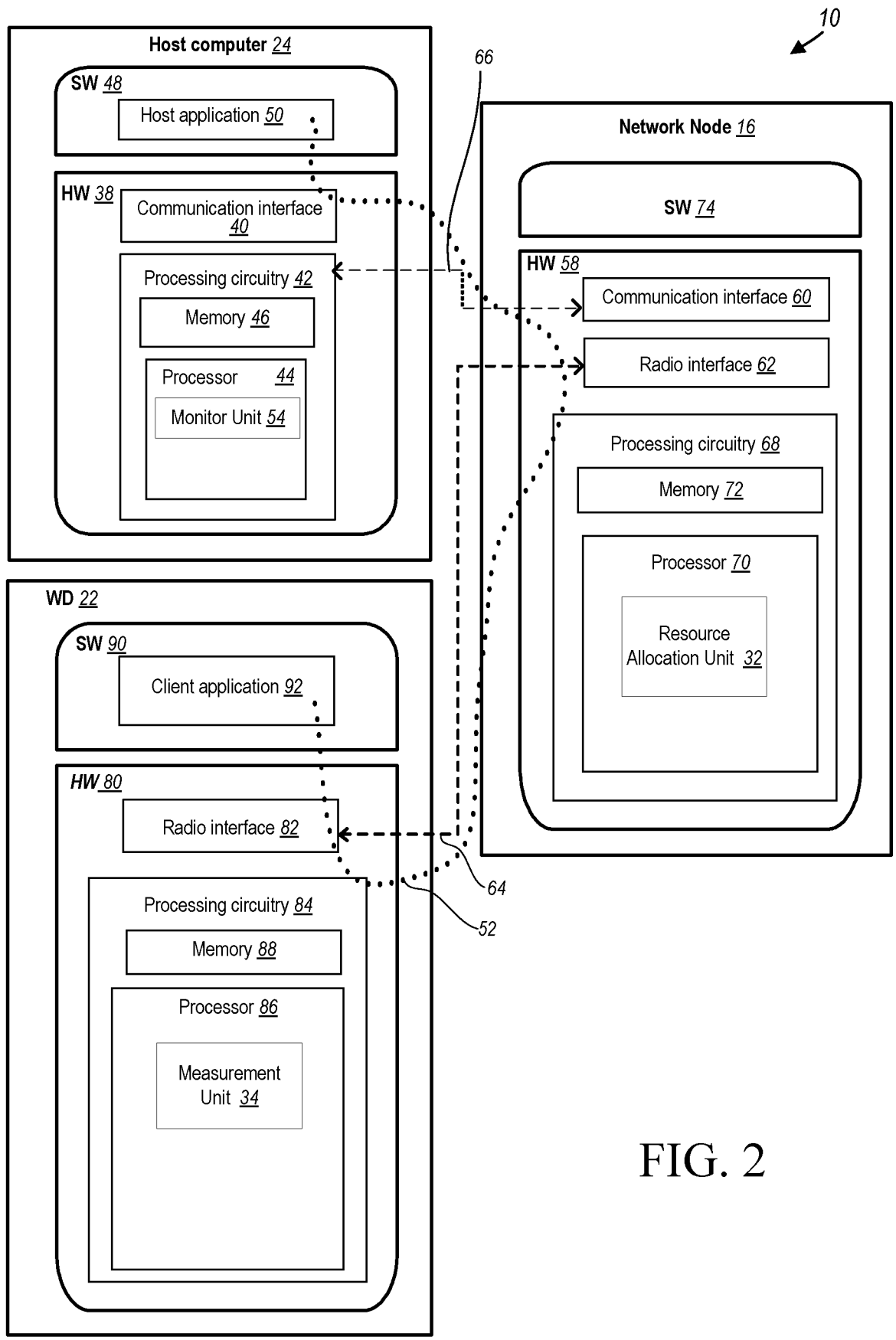
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as resource allocation unit 32, and measurement unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
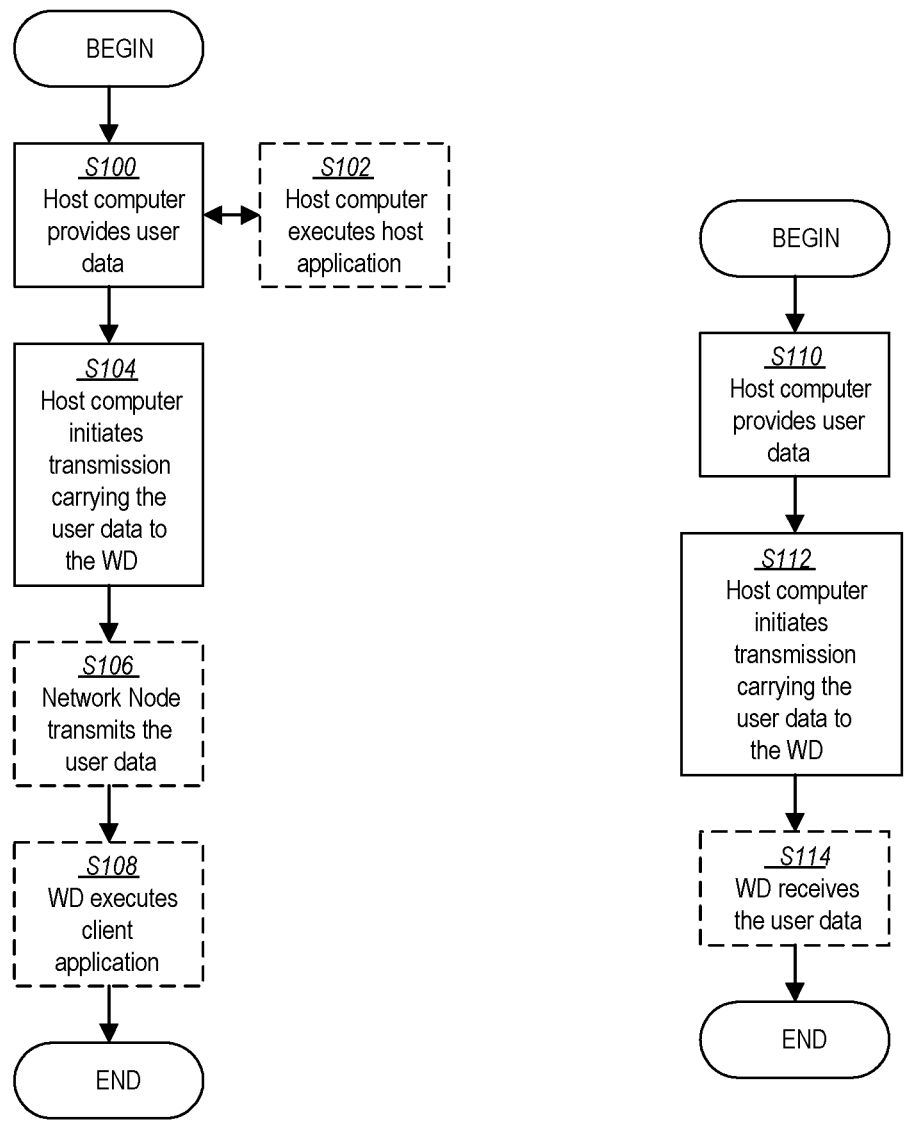
FIG. 3 is a flow chart illustrating example methods implemented in a communication system including a host computer, a network node and a wireless device for executing a client application at a wireless device according to some embodiments of the present disclosure.
FIG. 4 is a flow chart illustrating example methods implemented in a communication system including a host computer, a network node and a wireless device for receiving user data at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

Figures 5, 6:
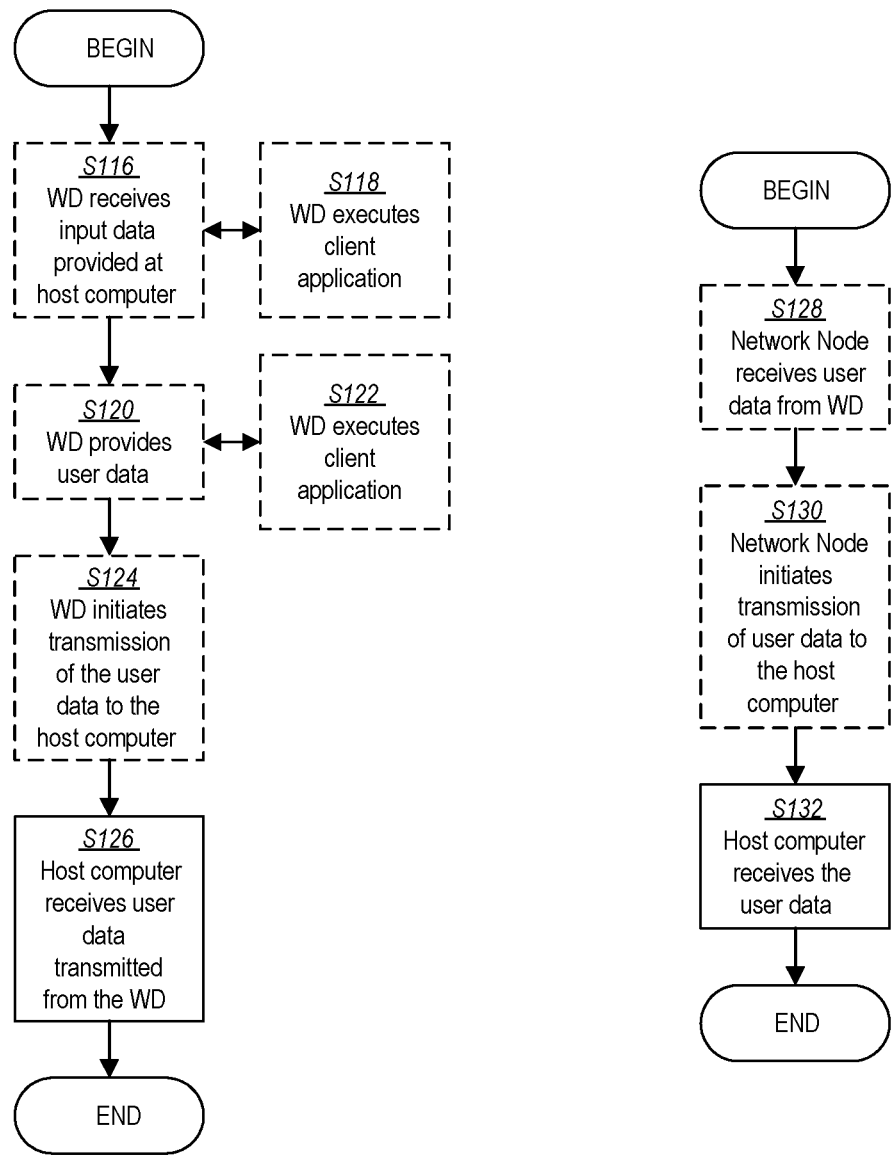
FIG. 5 is a flow chart illustrating methods implemented in a communication system including a host computer, a network node and a wireless device for receiving user data from the wireless device at a host computer according to some embodiments of the present disclosure.
FIG. 6 is a flow chart illustrating example methods implemented in a communication system including a host computer, a network node and a wireless device for receiving user data at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 7:
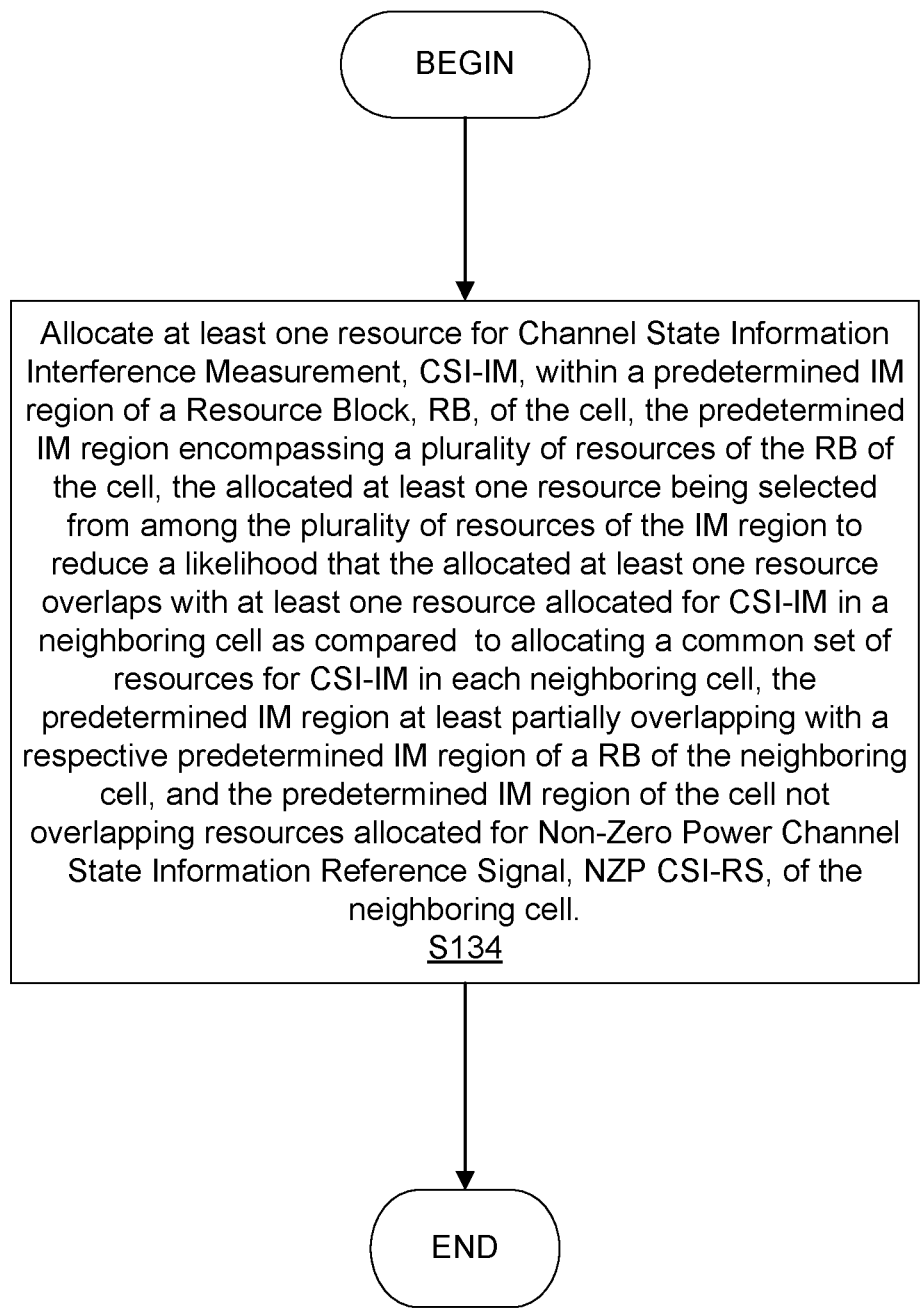
FIG. 7 is a flowchart of an example process in a network node for reference signal resource allocation according to some embodiments of the present disclosure.

FIG. 7 is a flowchart of an example method performed by a network node 16 for CSI-RS resource mapping. The process includes allocating, by for example the resource allocation unit 32 of the processing circuitry 68, at least one resource for Channel State Information Interference Measurement, CSI-IM, within a predetermined IM region of a Resource Block, RB (or, equivalently, a Transmit Time Interval, TTI), of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell (block S134). In some embodiments, the process further includes identifying, by for example the resource allocation unit 32, the at least one resource for the CSI-IM within the predetermined IM region of the RB of the cell based at least in part on an identifier of the cell. In some embodiments, the process further includes selecting at least one resource for Non-Zero Power, NZP, Channel State Information Reference Signal, CSI-RS, in a predetermined Reference Signal, RS, region of the RB of the cell, the predetermined RS region of the RB not overlapping with the predetermined IM region of the RB; and transmitting, such as via radio interface 62, the NZP CSI-RS on the selected at least one resource. In some embodiments, the predetermined IM region of the RB of the cell is a dedicated region for at least one CSI-IM resource, the dedicated region not comprising any NZP CSI-RS resources.

In some embodiments, predetermined RS region is a region of the RB of the cell configured for at least one CSI-RS resource, the predetermined RS region not comprising any CSI-IM resources. In some embodiments, the process further includes determining a slot offset for the CSI-IM based on a cell identifier, ID, of the cell being served by the network node 16. In some embodiments, the process further includes determining, such as via resource allocation unit 32, a period for the CSI-IM, the period for the CSI-IM being common to a group of cells, the group of cells including at least the cell and the neighboring cell. In some embodiments, the CSI-IM is mapped to the at least one resource of the predetermined IM region according to the determined period for the CSI-IM and the determined slot offset. In some embodiments, the CSI-IM is mapped to the at least one resource of the predetermined IM region according to a random selection algorithm. In some embodiments, the process further includes allocating at least one resource for Non-Zero Power, NZP, Channel State Information Reference Signal, CSI-RS, to at least partially overlap with at least one NZP CSI-RS resource of the neighboring cell. In some embodiments, the process further includes determining, such as via resource allocation unit 32, a period and a slot offset for the at least one NZP CSI-RS that is the same as a period and a slot offset for the at least one NPZ CSI-RS associated with the neighboring cell. In some embodiments, the process further includes transmitting, such as via radio interface 62, at least one Tracking Reference Signal, TRS, to at least partially overlap with at least one TRS of the neighboring cell. In some embodiments, the process further includes determining, such as via resource allocation unit 32, a period and a slot offset for at least one Tracking Reference Signal, TRS, that is the same as a period and a slot offset for at least one TRS associated with the neighboring cell; and transmitting, such as via radio interface 62, the at least one TRS according to the determined period and the determined slot offset. In some embodiments, the process further includes transmitting, such as via radio interface 62, at least one Tracking Reference Signal, TRS, in a fixed time domain location, the fixed time domain location being the same as a fixed time domain location of the neighboring cell. In some embodiments, the process further includes configuring, such as via resource allocation unit 32, Tracking Reference Signal, TRS, resources in the RB of the cell by, for each TRS symbol in the RB, dividing a plurality of subcarriers into at least four sets of subcarriers, each of the at least four sets of subcarriers corresponding to a TRS power level that is different from a TRS power level of the other of the at least four sets of subcarriers.

In some embodiments, the at least four sets of subcarriers includes a first set of subcarriers that is assigned for transmitting TRS at a regular TRS power level, a second set of subcarriers that is assigned for transmitting TRS at a power level that is 3 decibels, dB, higher than the regular TRS power level, a third set of subcarriers that is assigned for transmitting TRS at a power level that is 4.8 dB higher than the regular TRS power level, and a fourth set of subcarriers that is assigned for transmitting TRS at a power level that is 6 dB higher than the regular TRS power level. In some embodiments, TRS resources associated with the neighboring cell are also configured with the at least four sets of subcarriers for aligning Tracking Reference Signals, TRSs, of the same power level on the same set of the at least four sets of subcarriers. In some embodiments, the process further includes transmitting, such as via radio interface 62, at least one TRS on one of the at least four sets of subcarriers; and if the at least one TRS is transmitted on one of the second set, the third set and the fourth set of subcarriers, transmitting, such as via radio interface 62, a Zero-Power, ZP, Channel State Information Reference Signal, CSI-RS, on at least the first set of subcarriers.

Figure 8:
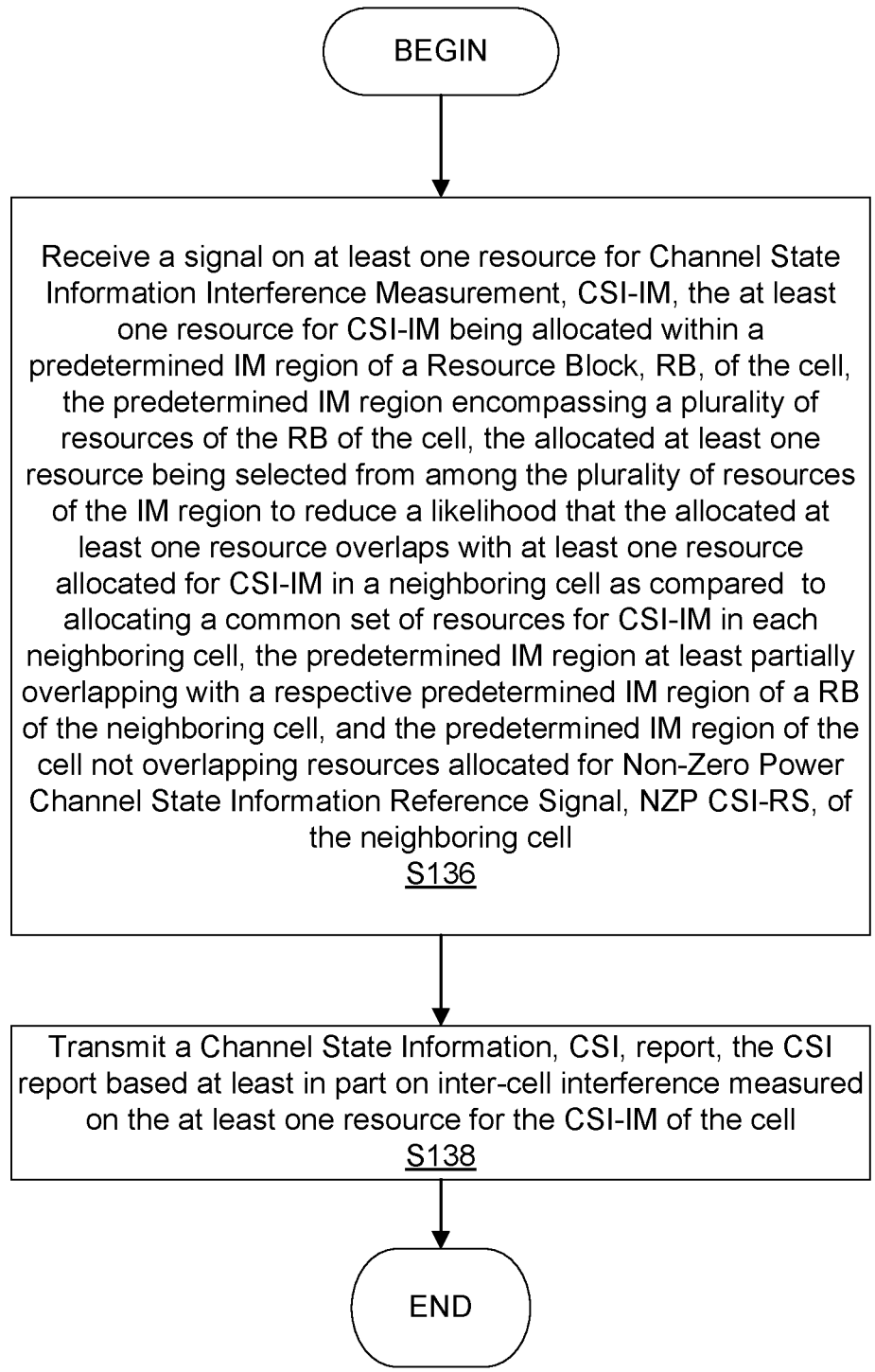
FIG. 8 is a flowchart of an example process in a wireless device for performing and reporting measurements on allocated reference signal resources according to some embodiments of the present disclosure.

FIG. 8 is a flowchart of an example method performed by a wireless device 22 according to some embodiments of the present disclosure. The process includes receiving, such as via radio interface 82, a signal on at least one resource for Channel State Information Interference Measurement, CSI-IM, the at least one resource for CSI-IM being allocated within a predetermined IM region of a Resource lock, RB (or, equivalently, a Transmit Time Interval, TTI), of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell (block S136). The process includes transmitting, such as via radio interface 82, a Channel State Information, CSI, report, the CSI report based at least in part on inter-cell interference measured on the at least one resource for the CSI-IM of the cell (block S138).

In some embodiments, the process includes receiving, such as via radio interface 82 and/or the measurement unit 34, at least one Non-Zero Power, NZP, Channel State Information Reference Signal, CSI-RS, in a predetermined Reference Signal, RS, region of the RB of the cell, the predetermined RS region of the RB not overlapping with the predetermined IM region of the RB. In some embodiments, the predetermined IM region of the RB of the cell is a dedicated region for at least one CSI-IM resource, the dedicated region not comprising any NZP CSI-RS resources. In some embodiments, the predetermined RS region is a region of the RB of the cell configured for at least one CSI-RS resource, the predetermined RS region not comprising any CSI-IM resources. In some embodiments, the CSI-IM is mapped to the at least one resource of the predetermined IM region according to at least a slot offset, the slot offset based at least in part on a cell identifier, ID. In some embodiments, the CSI-IM is mapped to the at least one resource of the predetermined IM region according to a random selection algorithm. In some embodiments, the process includes receiving, such as via radio interface 82 and/or the measurement unit 34, at least one Non-Zero Power, NZP, Channel State Information Reference Signal, CSI-RS, that at least partially overlaps with at least one NZP CSI-RS of at least a neighboring cell.

In some embodiments, a period and a slot offset for the received at least one NZP CSI-RS is the same as a period and a slot offset for the at least one NPZ CSI-RS associated with the neighboring cell. In some embodiments, the process further includes receiving, such as via radio interface 82 and/or the measurement unit 34, at least one Tracking Reference Signal, TRS, that at least partially overlaps with at least one TRS of a neighboring cell. In some embodiments, a period and a slot offset for the at least one TRS is the same as a period and a slot offset for the at least one TRS of the neighboring cell. In some embodiments, the received TRS is in a fixed time domain location, the fixed time domain location being the same as a fixed time domain location of the neighboring cell. In some embodiments, the process further includes receiving, such as via radio interface 82 and/or the measurement unit 34, at least one Tracking Reference Signal, TRS, on one of at least four sets of subcarriers in the RB, the at least four sets of subcarriers comprising a first set of subcarriers that is assigned for transmitting TRS at a regular TRS power level, a second set of subcarriers that is assigned for transmitting TRS at a power level that is 3 decibels, dB, higher than the regular TRS power level, a third set of subcarriers that is assigned for transmitting TRS at a power level that is 4.8 dB higher than the regular TRS power level, and a fourth set of subcarriers that is assigned for transmitting TRS at a power level that is 6 dB higher than the regular TRS power level. In some embodiments, the process further includes receiving, such as via radio interface 82 and/or the measurement unit 34, the at least one TRS on one of the at least four sets of subcarriers; and if the at least one TRS is transmitted on one of the second set, the third set and the fourth set of subcarriers, receiving a Zero-Power, ZP, Channel State Information Reference Signal, CSI-RS, on at least the first set of subcarriers.

Having described some embodiments of this disclosure for CSI-RS resource mapping, a more detailed description of some of the embodiments is described below.

CSI-IM

The resources for CSI-IM may be used (e.g., by the WD 22) for measuring inter-cell interference. If a cell's CSI-IM REs overlap with NZP CSI-RS (including TRS) of neighbor cells, the WDs 22 in the cell may observe the interference from the neighbor's NZP CSI-RS regardless of the traffic load of the neighboring cells, which can lead to over-estimation of the interference. On the other hand, if the cell's CSI-IM REs overlap completely with the CSI-IM of neighbor cells, WDs 22 in the cell are not able to detect any interference from the neighbor cells, which can lead to under-estimation of the interference.

Thus, the present disclosure provides at least two resource allocation rules that may be used by e.g., the network node 16 for allocating reference signal resources in a communication network with neighboring cells. In one embodiment of this disclosure, for CSI-IM resource allocation, the network node 16 (e.g., via resource allocation unit 32) serving a cell may allocate resources for CSI-IM to avoid (or at least minimize) overlapping the cell's CSI-IM with a neighbor cell's NZP CSI-RS, including TRS. Further, in one embodiment, the network node 16, such as via the resource allocation unit 32, may allocate resources for CSI-IM to avoid (or at least minimize) overlapping the cell's CSI-IM with the neighbor cell's CSI-IM.

In some embodiments, for periodic resources, it is possible to use a period and a slot offset to implement the resource allocation rules above, but it may be complicated to coordinate the period and slot offset configurations between all neighboring cells. In some embodiments, for aperiodic resources, if the network node 16, such as via the resource allocation unit 32, attempts to configure resources according to the resource allocation rules above, the scheduling of interference measurements may become very complicated.

One technique for addressing one or more of these issues is to have a predetermined or dedicated IM region for CSI-IM within a physical resource, such as, for example, a resource block (RB), a subframe, a slot, or a Transmission Time Interval (TTI). In one embodiment, the NZP CSI-RS (including TRS) of any cell should not be mapped to this dedicated IM region. The PDSCH may still be able to be mapped to the REs in the IM region though, if such REs are not allocated for CSI-IM. In one embodiment, in addition to the predetermined IM region for CSI-IM, there may be a predetermined reference signal region in e.g., the TTI or RB of the cell for NZP CSI-RS. The predetermined reference signal (RS) region may be configured to not overlap with the IM region of the TTI. Thus, according to these embodiments, avoiding overlapping the cell's CSI-IM with a neighboring cell's NZP CSI-RS may be accomplished. It is noted that it may be possible to have multiple CSI-IM resources within a CSI-IM region.

For allocating resources for CSI-IM to avoid (or at least minimize) overlapping the cell's CSI-IM with the neighbor cell's CSI-IM, with periodic CSI-IM resources, the network node 16, such as via resource allocation unit 32, may determine a CSI-IM period and a CSI-IM slot offset. The CSI-IM period may be configured by operators. Thus, in one embodiment, the CSI-IM period may be a period that is a common CSI-IM period to at least a group of neighboring cells. However, the slot offset can be determined based on, for example, a cell identifier (ID), or another parameter that can be used to differentiate one cell from a neighboring cell e.g., for purposes of avoiding or minimizing allocating CSI-IM resources that overlap with CSI-IM resources allocated in the neighboring cell. For example, the network node 16, such as via the resource allocation unit 32, may determine the slot offset according to: slot offset=(cell ID) mod (configured CSI-IM period). It should be understood that, in some embodiments, overlapping of CSI-IM resources of neighboring cells may not be completely or entirely avoidable. However, by using at least some of the principles of the present disclosure, such overlap of CSI-IM resources of neighboring cells may be minimized, as compared to existing CSI reference signal resource allocation techniques.

In one embodiment, the predetermined IM region is a region of a set of radio resources (e.g., RB, TTI, slot, subframe, etc.) that includes a plurality of CSI-IM resources. The predetermined IM region may overlap a corresponding IM region in a neighboring cell. However, within this predetermined region at least one CSI-IM resource may be allocated by the network node 16, such as via the resource allocation unit 32, for the CSI-IM of the cell and this at least one resource may be selected and allocated by the network node 16 serving the cell so that that allocated CSI-IM resource(s) do not overlap the corresponding resources allocated to CSI-IM in the neighboring cell.

Given that there may be multiple CSI-IM resources within the predetermined CSI-IM region, some resource selection algorithms may be used e.g., by the network node 16 to further minimize the CSI-IM resource overlap between neighbor cells. For example, one resource selection algorithm may be based at least in part on an identifier of the cell. Another resource selection algorithm may be a random selection algorithm or function. In other embodiments, other resource selection algorithms may be used to avoid or reduce the likelihood of overlap of allocated CSI-IM resources between neighbor cells according to the principles of this disclosure.

Accordingly, some embodiments of this disclosure may provide techniques for minimizing or avoiding overlapping of a cell's allocated resources for CSI-IM with at least one neighboring cell's allocated resources (e.g., NZP CSI-RS, TRS, CSI-IM) to advantageously reduce at least some of the drawbacks associated with inter-cell interference.

NZP CSI-RS

NZP CSI-RS can be used for channel and/or interference measurements by the WD 22. When NZP CSI-RS is used for interference measurement, it is typically used for the measurement of intra-cell interference, or the interference between WDs 22 that are co-scheduled for MU-MIMO. For NZP CSI-RS, the network node 16 can transmit NZP CSI-RS in one of three forms: no beamforming, common beamforming, and WD-specific beamforming. Given that WD-specific beamforming is normally performed on the PDSCH, allowing the cell's NZP CSI-RS to collide with a neighbor cell's NZP CSI-RS may not be worse (e.g., in terms of performance) than allowing the cell's NZP CSI-RS to collide with the neighbor cell's PDSCH. In fact, in some cases, allowing such a collision/overlapping can result in a better performance, as compared with allocating resources to avoid the collision. For example, when a cell's non-beamformed NZP CSI-RS collides with the neighbor cell's non-beamformed NZP CSI-RS, the interference on the CSI-RS from the neighbor cell is likely less than that when the interference is from the neighbor cell's PDSCH, which can allow for a better channel measurement. Since these resources may not be used for interference measurement, NZP CSI-RS collision should not cause overestimation of interference.

Thus, the present disclosure provides another resource allocation rule for NZP CSI-RS. In one embodiment, the network node 16, such as via the resource allocation unit 32, may allocate NZP CSI-RS resources to align NZP CSI-RSs of neighboring cells. Stated another way, in one embodiment, the network node 16 may allocate NZP CSI-RS to at least partially overlap with NZP CSI-RS of at least one neighboring cell. In yet other embodiments, the network node 16 may not be configured to allocate NZP CSI-RS resources to avoid overlapping with NZP CSI-RSs of neighboring cells.

Thus, in one embodiment, performance may be improved as a result of NZP CSI-RS from all neighboring cells (or at least some neighboring cells) overlapping with one another. In some embodiments, the network node 16, such as via the resource allocation unit 32, can be configured to attempt to maximize the degree of overlapping. For example, for periodic NZP CSI-RS resources, NZP CSI-RS can have the same period and the same slot offset for all cells (or at least a group of neighboring cells). The network node 16, such as via the resource allocation unit 32, may also be configured to determine or identify at least some symbols as preferred symbols for NZP CSI-RS and, at least initially, use all REs in those preferred symbols for NZP CSI-RS before allocating other symbols for NZP CSI-RS. Accordingly, the network node 16, such as via the resource allocation unit 32, can be configured with rules designed to align, or maximize the overlap of NZP CSI-RS with neighboring cell NZP CSI-RS.

TRS

In one embodiment, assuming no WD-specific beamforming for TRS, one or more of the following rules are provided for TRS resource mapping by e.g., a resource allocation unit 32 in a network node 16:

use the same period and slot offset for all (or at least some neighboring) cells,
have a fixed time domain location for TRS,
align TRSs with the same power level, and
use different REs for TRSs with different power levels.

According to 3GPP specifications, for sub-6 GHz or frequency range 1, the TRS resource set may include four periodic CSI-RS resources in two consecutive slots with two CSI-RS resources in each of the two consecutive slots. The time-domain locations of the two CSI-RS resources in a slot may be given by one of {4, 8}, {5, 9}, or {6, 10}. For frequency range 2, other time-domain locations may also be allowed. In each OFDM symbol, 3 REs can be allocated for TRS, while the other REs can be configured as ZP CSI-RS if a TRS power boost is used.

Based on one or more of the TRS rules provided above, a fixed time domain location can be selected by e.g., the network node 16 (for example, {5, 9}) for all (or at least some neighboring) cells. In one embodiment, for each TRS symbol, the network node 16 may divide the 12 subcarriers into at least four sets of subcarriers as follows: one set for regular power level TRS; one set for 3 dB power boost TRS; one set for 4.8 dB power boost TRS; and one set for 6 dB power boost TRS (see e.g., FIGS. 14-17).

Specifically, according to one example embodiment, subcarriers 0, 4, and 8 may be configured e.g., by a resource allocation unit 32 in the network node 16 for regular power level TRS for all WDs 22 in all (or at least some neighboring) cells. If 3 dB power boost is configured for a cell, subcarriers 1, 5, 9 may be allocated for TRS while subcarriers 0, 4, 8 are configured as ZP CSI-RS. If 4.8 dB power boost is configured for a cell, subcarriers 2, 6, 10 may be allocated for TRS while subcarriers 0, 1, 4, 5, 8 and 9 are configured as ZP CSI-RS. If 6 dB power boost is configured for a cell, subcarriers 3, 7, 11 may be allocated for TRS while subcarriers 0, 1, 2, 4, 5, 6, 8, 9 and 10 are configured as ZP CSI-RS. By doing so, according to this embodiment, TRS with the same power level may be aligned amongst the neighboring cells and different REs may be used for TRSs with different power levels. For example, this example embodiment may result in the following resource configurations:

TRS with the regular power level may overlap with—
 TRS with the regular power level from neighbor cells, for which TRS power boost is not configured, or
 ZP CSI-RS from neighbor cells, for which TRS power boost is configured;
TRS with 3 dB power boost may overlap with—
 TRS with 3 dB power boost from neighbor cells, for which 3 dB TRS power boost is configured, or
 PDSCH from neighbor cells, for which TRS power boost is not configured, or
 ZP CSI-RS from neighbor cells, for which 4.8 dB or 6 dB TRS power boost is configured;
TRS with 4.8 dB power boost may overlap with—
 TRS with 4.8 dB power boost from neighbor cells, for which 4.8 dB TRS power boost is configured, or
 PDSCH from neighbor cells, for which TRS power boost is less than 4.8 dB, or
 ZP CSI-RS from neighbor cells, for which 6 dB TRS power boost is configured; and
TRS with 6 dB power boost may overlap with—
 TRS with 6 dB power boost from neighbor cells, for which 6 dB TRS power boost is configured, or
 PDSCH from neighbor cells, for which TRS power boost is less than 6 dB.

Thus, if neighboring cells are configured with these TRS allocation rules, the overlapping of resources may be optimized to e.g., reduce inter-cell interference error. Some advantages for this kind of TRS configuration may include one or more of the following:

TRS with the regular power level may not experience strong interference of PDSCH from neighbor cells. Since PDSCH is beamformed per WD 22, the interference of PDSCH can be quite strong.
TRS with power boost may experience interference from PDSCH from neighbor cells. The power boost level can be adjusted to handle the strong interference of PDSCH.
TRS with power boost may collide with TRS from neighbor cells at the same power boost level. The assumption for TRS power boost is that TRS coverage may be limited while TRS interference is not a dominant factor. When TRS with the same power boost level collides, the signal to interference ratio is the same as with no power boost.
When TRS power level is increased for a given cell, for example, from 3 dB to 4.8 dB, it doesn't change the interference to TRS of the neighbor cells, either without power boost or with power boost of 6 dB. The interference to TRS of the neighbor cells with power boost of 3 dB may be removed. The interference to TRS of the neighbor cells with power boost of 4.8 dB may be expected to be reduced since the interference is now due to TRS instead of PDSCH.

Having described some embodiments for CSI-RS resource mapping according to some embodiments of the present disclosure, some specific resource partition examples are provided in FIGS. 9-19. In at least some of the resource partition examples, in addition to CSI-RS and CSI-IM being configured in separate regions and/or with non-overlapping resources, yet other signals and/or channels may be configured in separate regions and/or with non-overlapping resources, such as, for example, Physical Downlink Control Channel (PDCCH) and Physical Downlink Shared Channel (PDSCH) Demodulation Reference Signal (DMRS). It is noted that these examples are non-limiting and are intended to aid understanding of the disclosure and embodiments, and not as the only possible resource partition examples.

Figure 9:
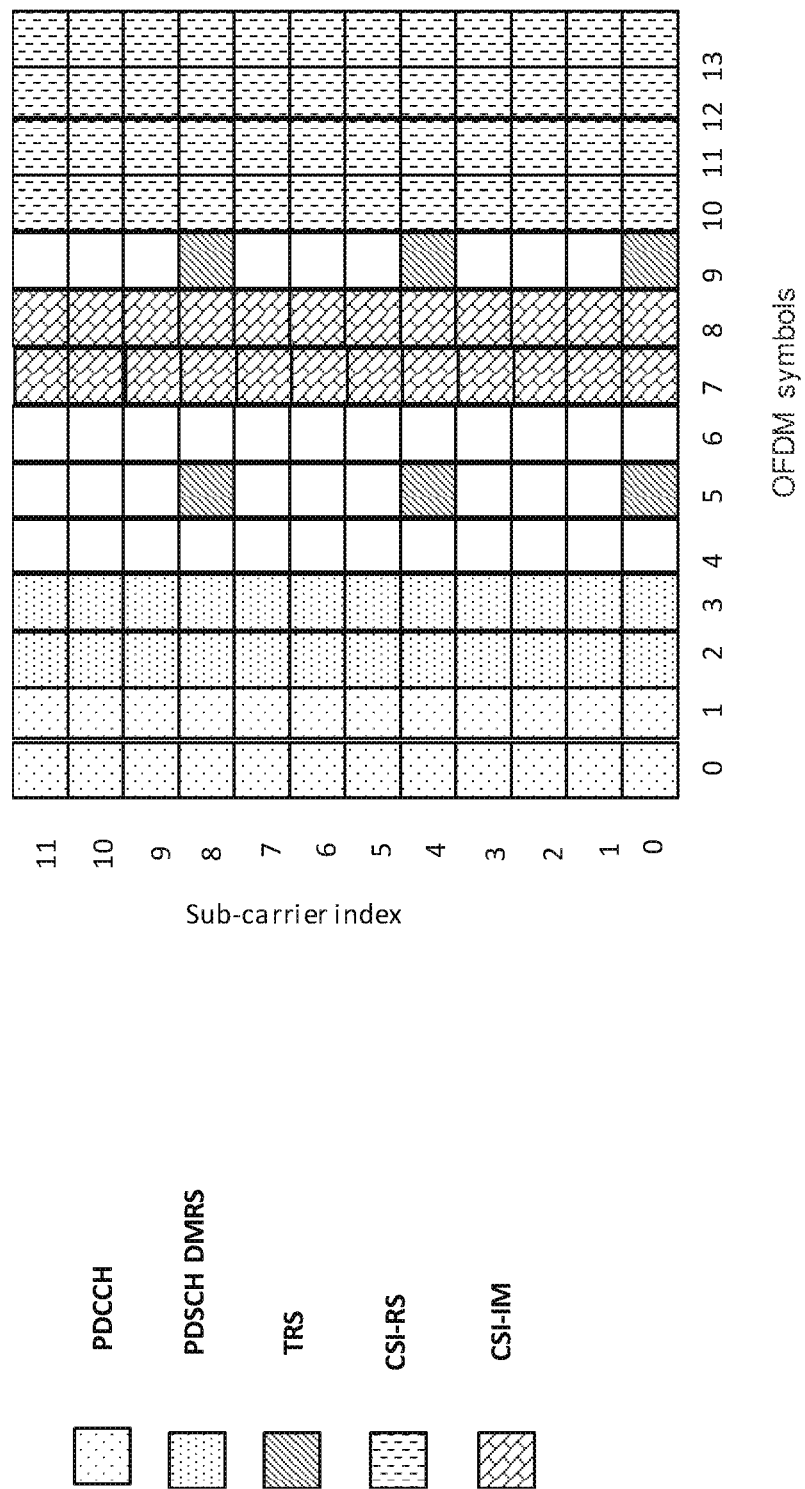
FIG. 9 is a block diagram of a first example resource partition according to one embodiment of the present disclosure.

FIG. 9 illustrates a first example resource partition of a subframe. The example shows the OFDM symbols 2 and 3 being configured for PDSCH DMRS. The TRS is shown at OFDM symbols 5 and 9, with three REs in each OFDM symbol at subcarriers 0, 4 and 8. The last four OFDM symbols in the subframe are configured as the CSI-RS region. The CSI-IM region is at OFDM symbols 7 and 8.

Figure 10:
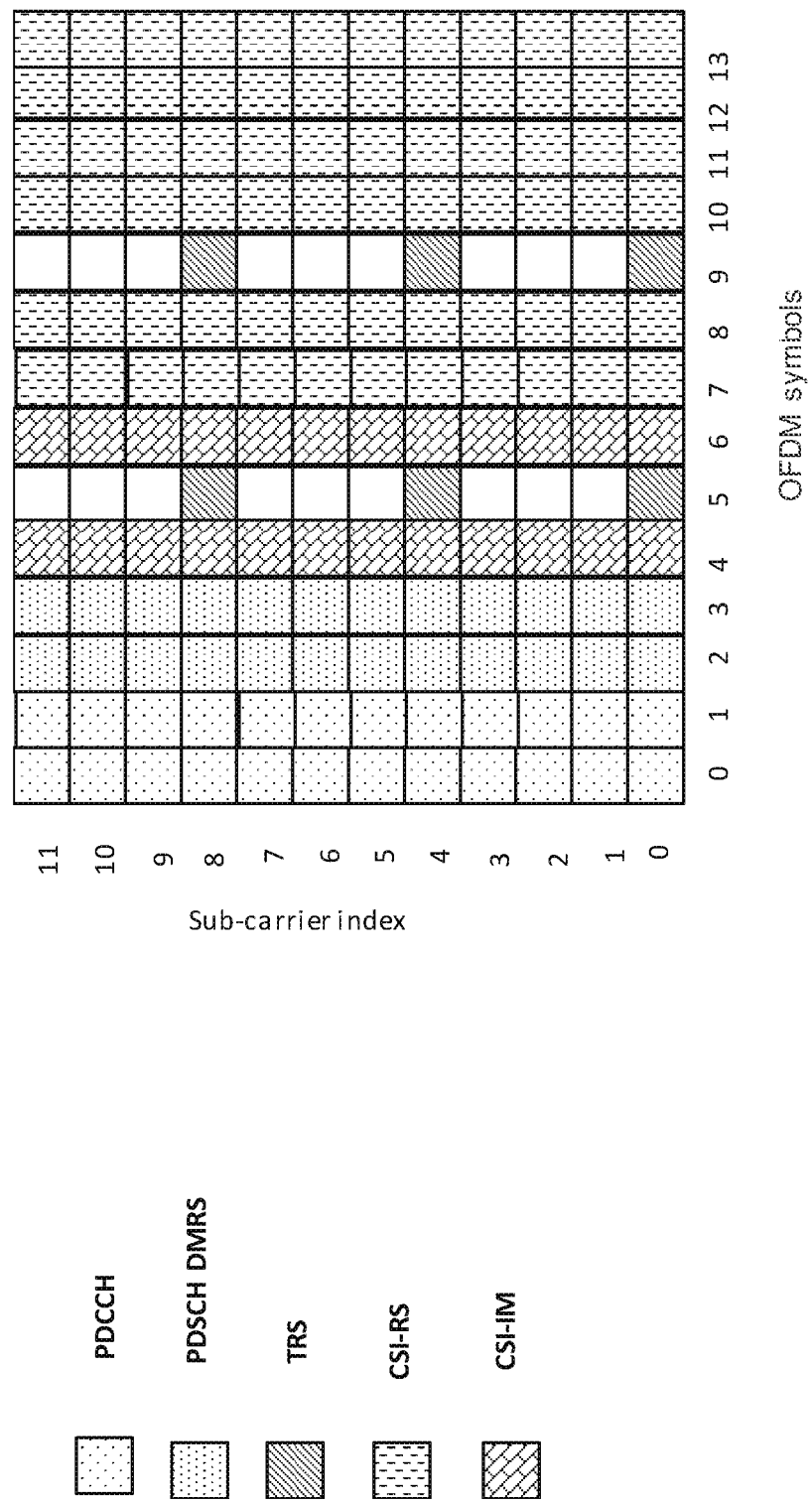
FIG. 10 is a block diagram of a second example resource partition according to one embodiment of the present disclosure.

FIG. 10 illustrates a second example resource partition of a subframe. In this example, the CSI-IM region is at OFDM symbols 4 and 6 and includes additional OFDM symbols for CSI-RS in OFDM symbols 7 and 8.

Figure 11:
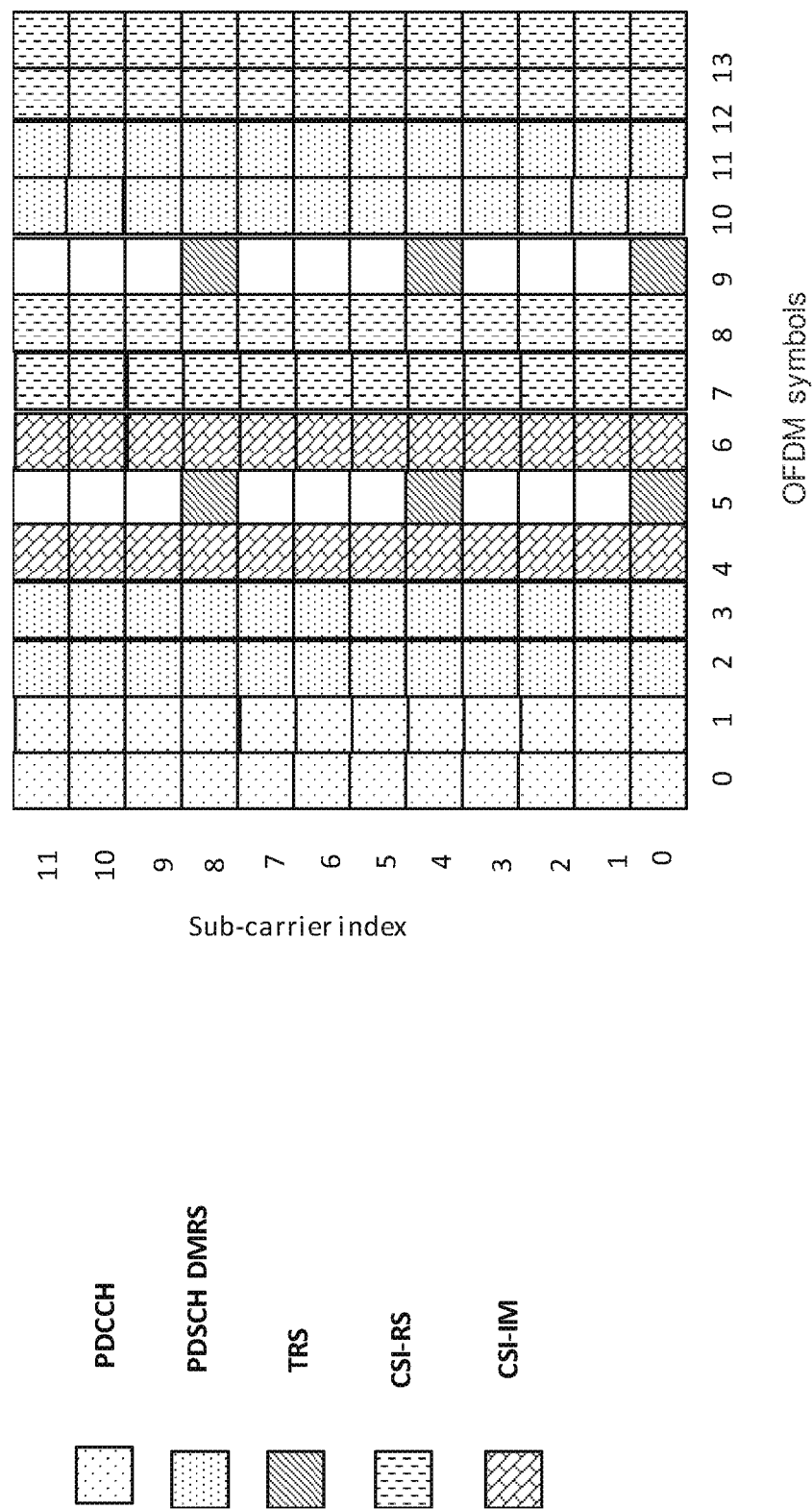
FIG. 11 is a block diagram of a third example resource partition according to one embodiment of the present disclosure.

FIG. 11 illustrates a third example resource partition of a subframe. In this example, additional OFDM symbols are configured for PDSCH DMRS, namely OFDM symbols 2, 3 as well as 10 and 11. The CSI-RS region is at OFDM symbols 7, 8, 12 and 13. The CSI-IM region is at OFDM symbols 4 and 6.

Figure 12:
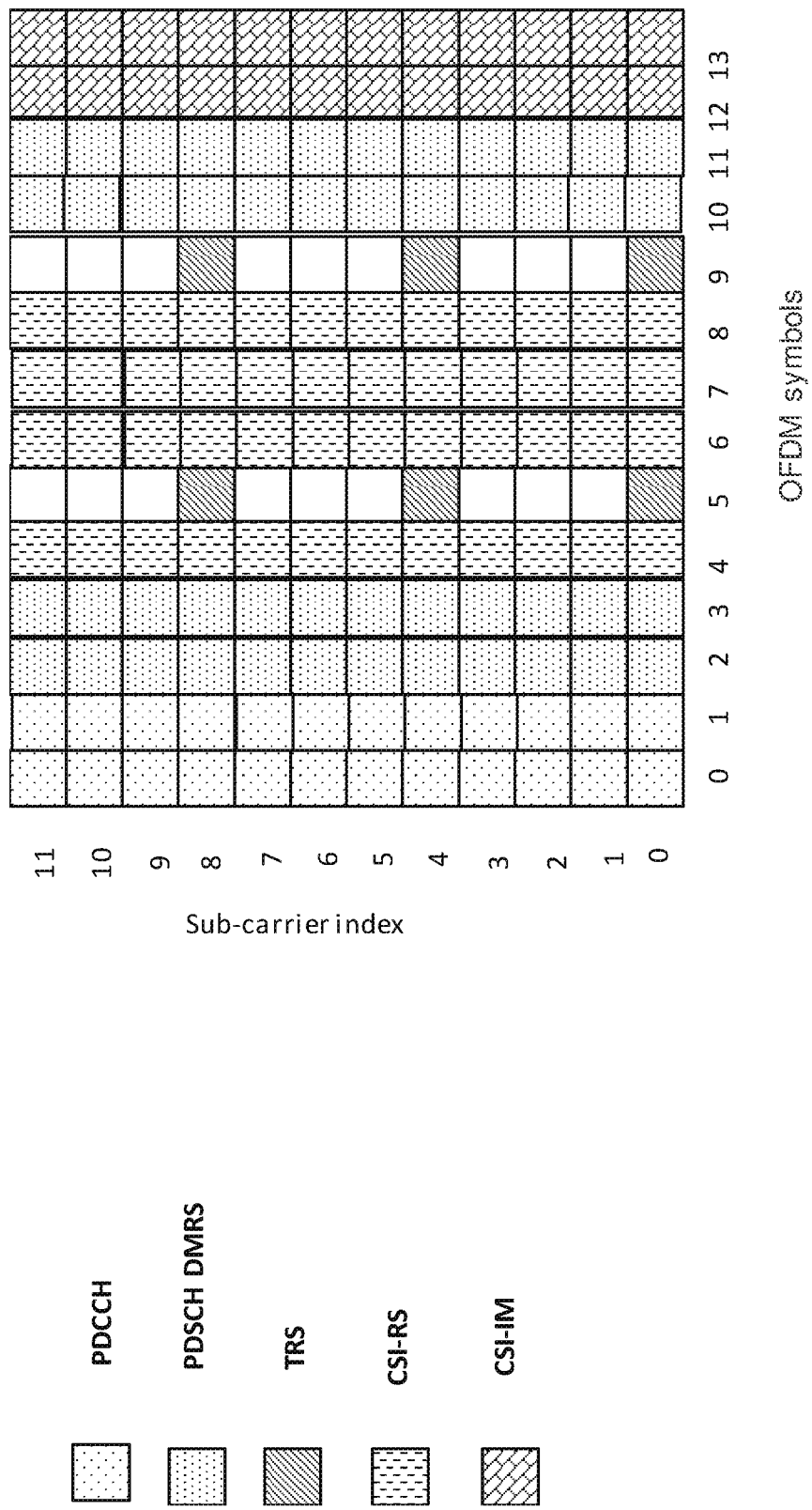
FIG. 12 is a block diagram of a fourth example resource partition according to one embodiment of the present disclosure.

FIG. 12 illustrates a fourth example resource partition of a subframe. In this example, the CSI-RS region is at OFDM symbols 4, 6, 7 and 8. The CSI-IM region is at OFDM symbols 12 and 13.

Figure 13:
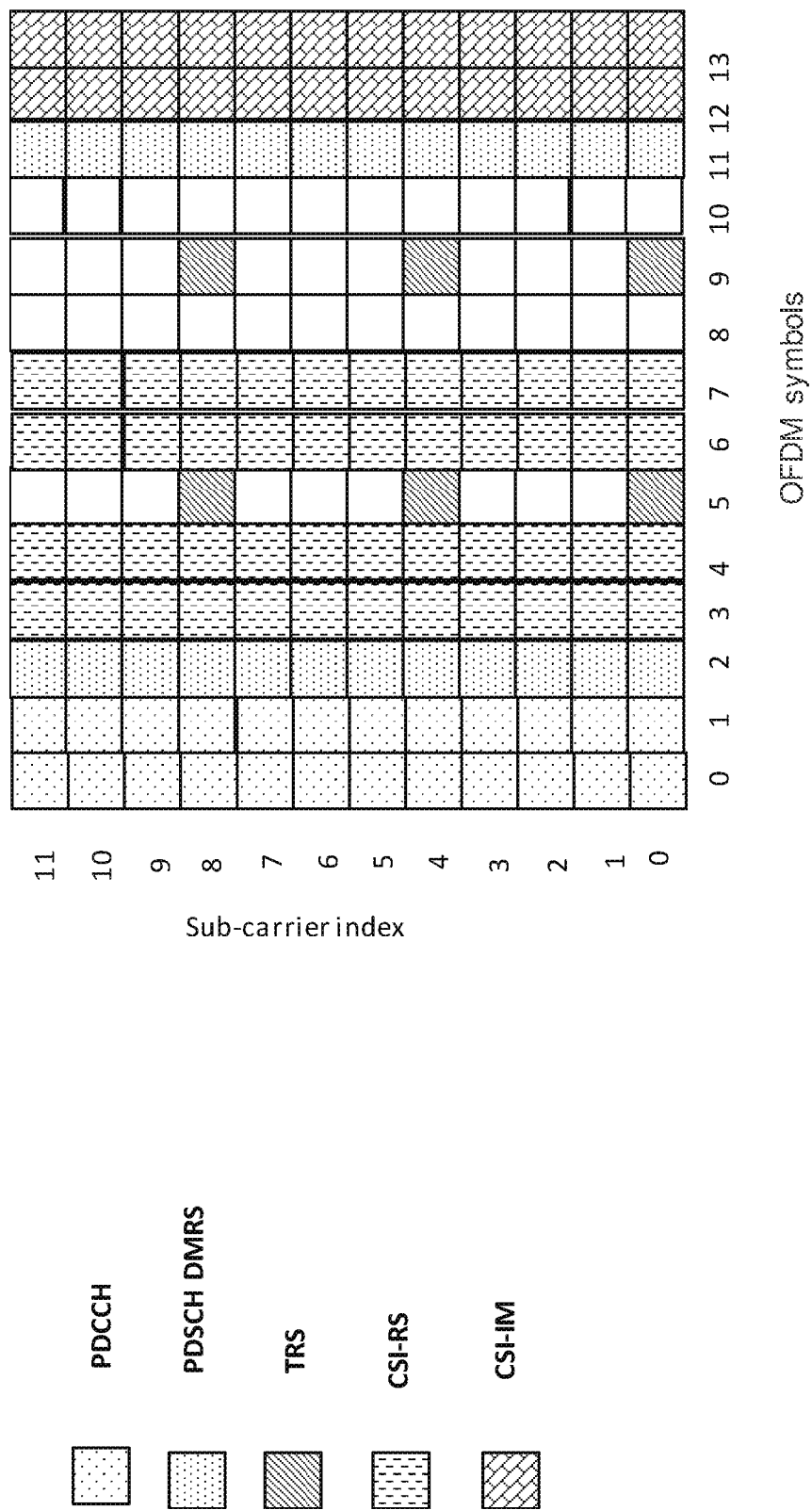
FIG. 13 is a block diagram of a fifth example resource partition according to one embodiment of the present disclosure.

FIG. 13 illustrates a fifth example resource partition of a subframe. In this example, the CSI-RS region is at OFDM symbols 3, 4, 6 and 7. The PDSCH DMRS is at OFDM symbols 2 and 11.

Figure 14:
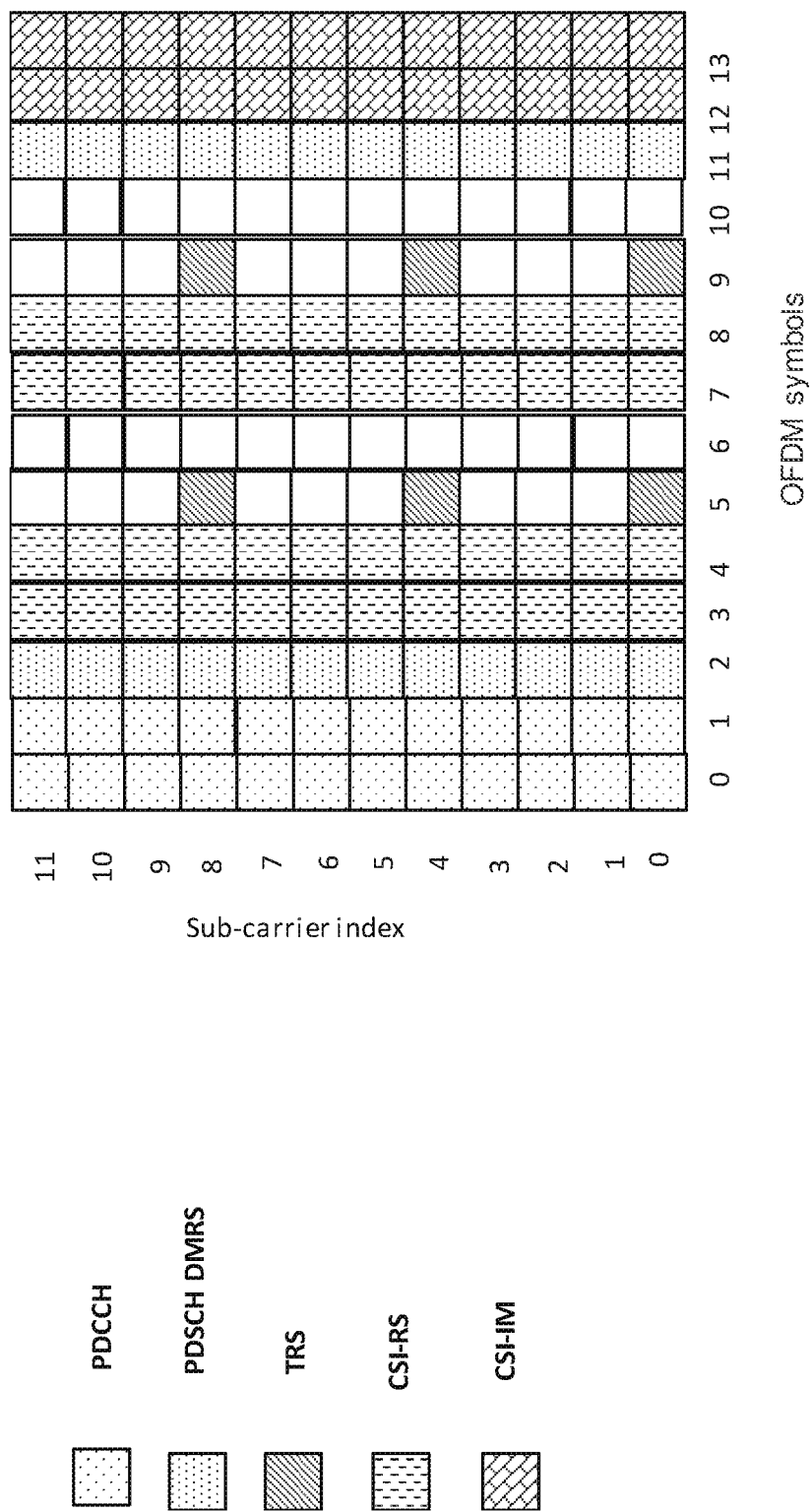
FIG. 14 is a block diagram of a sixth example resource partition according to one embodiment of the present disclosure.

FIG. 14 illustrates a sixth example resource partition of a subframe. In this example, the CSI-RS region is mapped to OFDM symbols 3, 4, 7 and 8.

Figure 15:
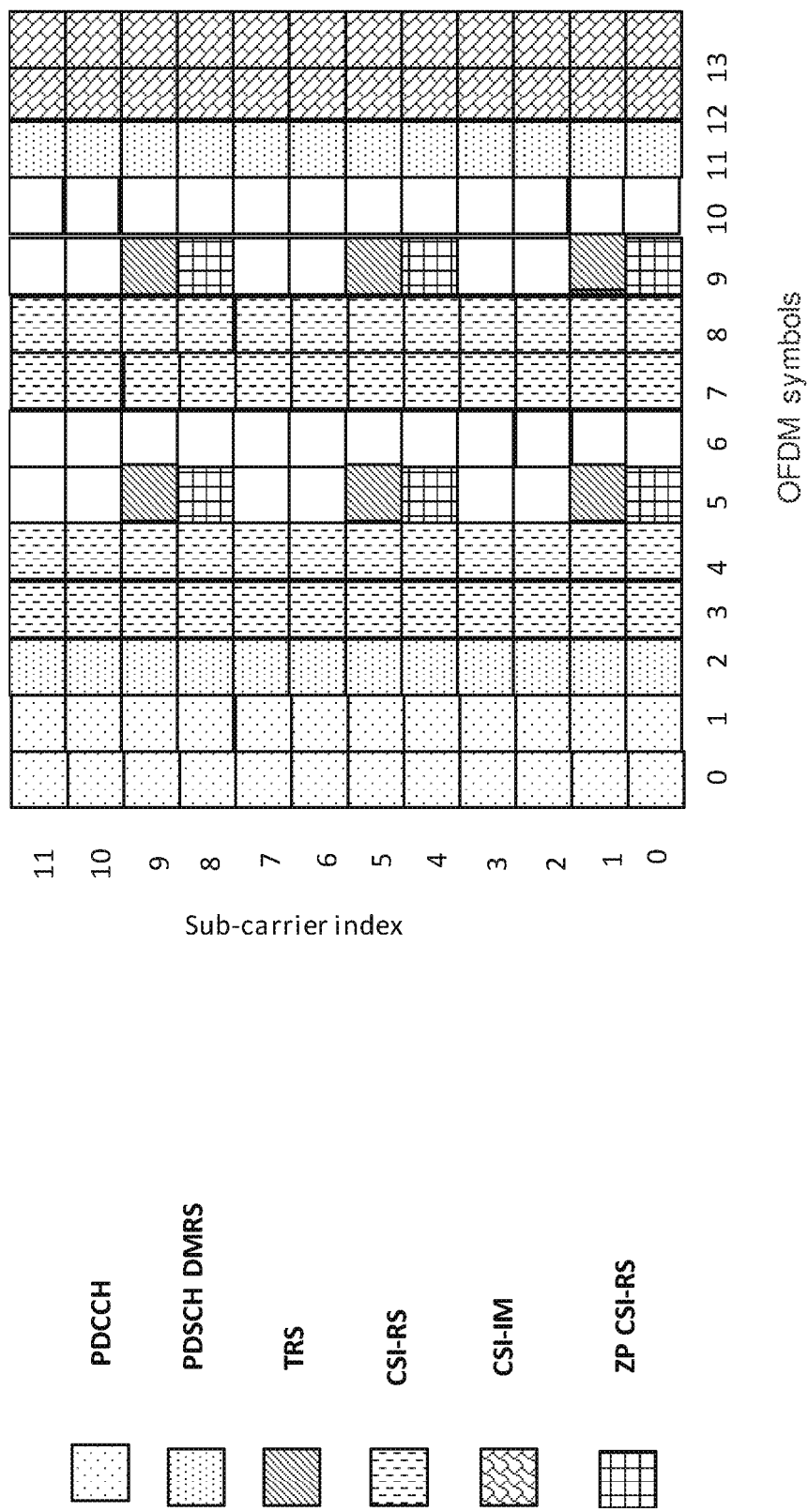
FIG. 15 is a block diagram of a seventh example resource partition according to one embodiment of the present disclosure.

FIG. 15 illustrates a seventh example resource partition of a subframe. In this example, resources are configured with a TRS power boost of 3 dB, where Zero Power (ZP) CSI-RS is required. The TRS is mapped to OFDM symbols 5 and 9 at subcarriers 1, 5 and 9. ZP CSI-RS is mapped to OFDM symbols 5 and 9 at subcarriers 0, 4 and 8, according to the embodiments discussed above for aligning TRSs with the same power levels.

Figure 16:
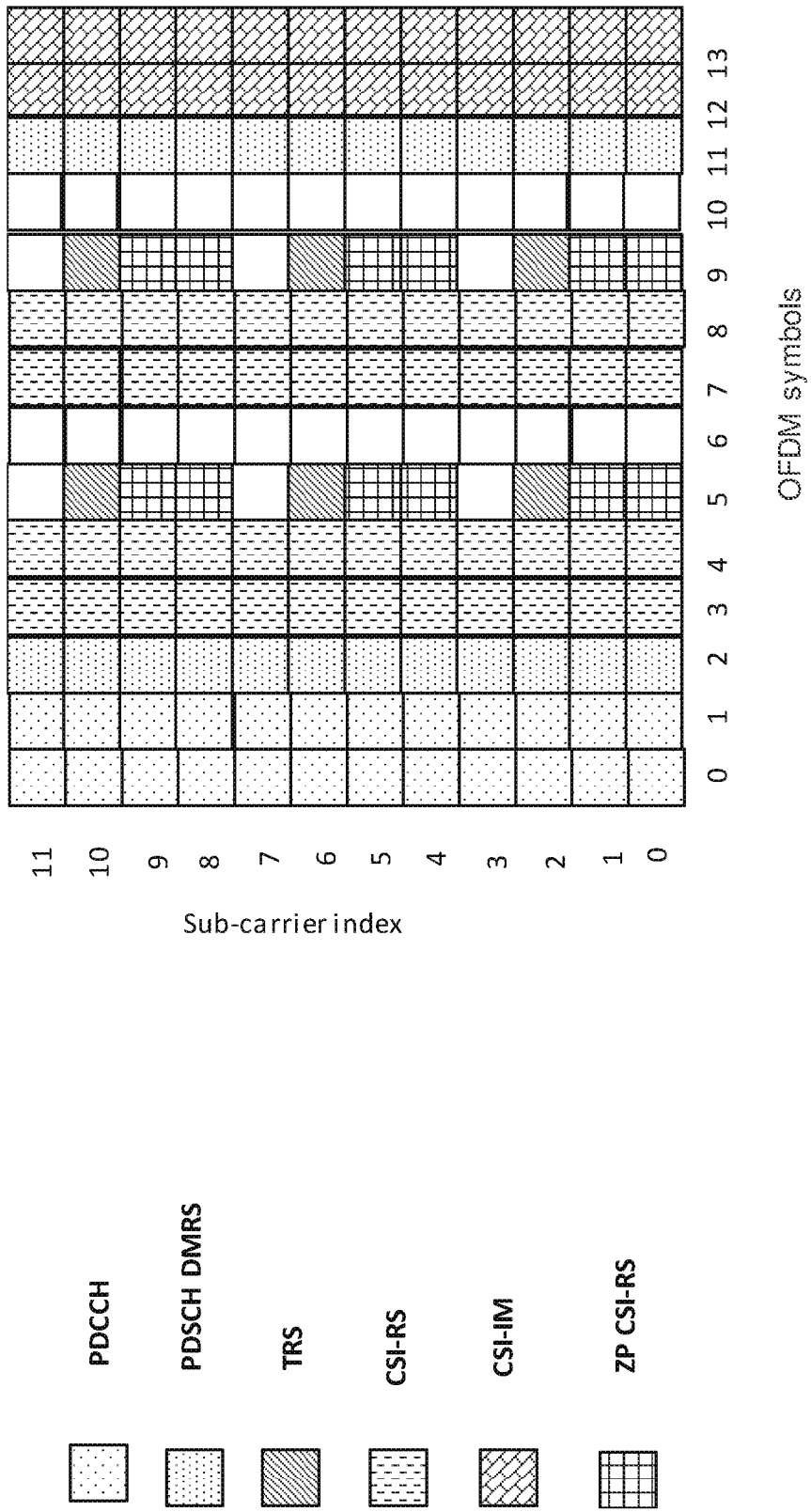
FIG. 16 is a block diagram of an eighth example resource partition according to one embodiment of the present disclosure.

FIG. 16 illustrates an eight example resource partition of a subframe. In this example, resources are configured with a TRS power boost of 4.8 dB, where ZP CSI-RS is required. The TRS is mapped to OFDM symbols 5 and 9 at subcarriers 2, 6 and 10. ZP CSI-RS is mapped to OFDM symbols 5 and 9 at subcarriers 0, 4 and 8, as well as, subcarriers 1, 5 and 9, according to the embodiments discussed above for aligning TRSs with the same power levels.

Figure 17:
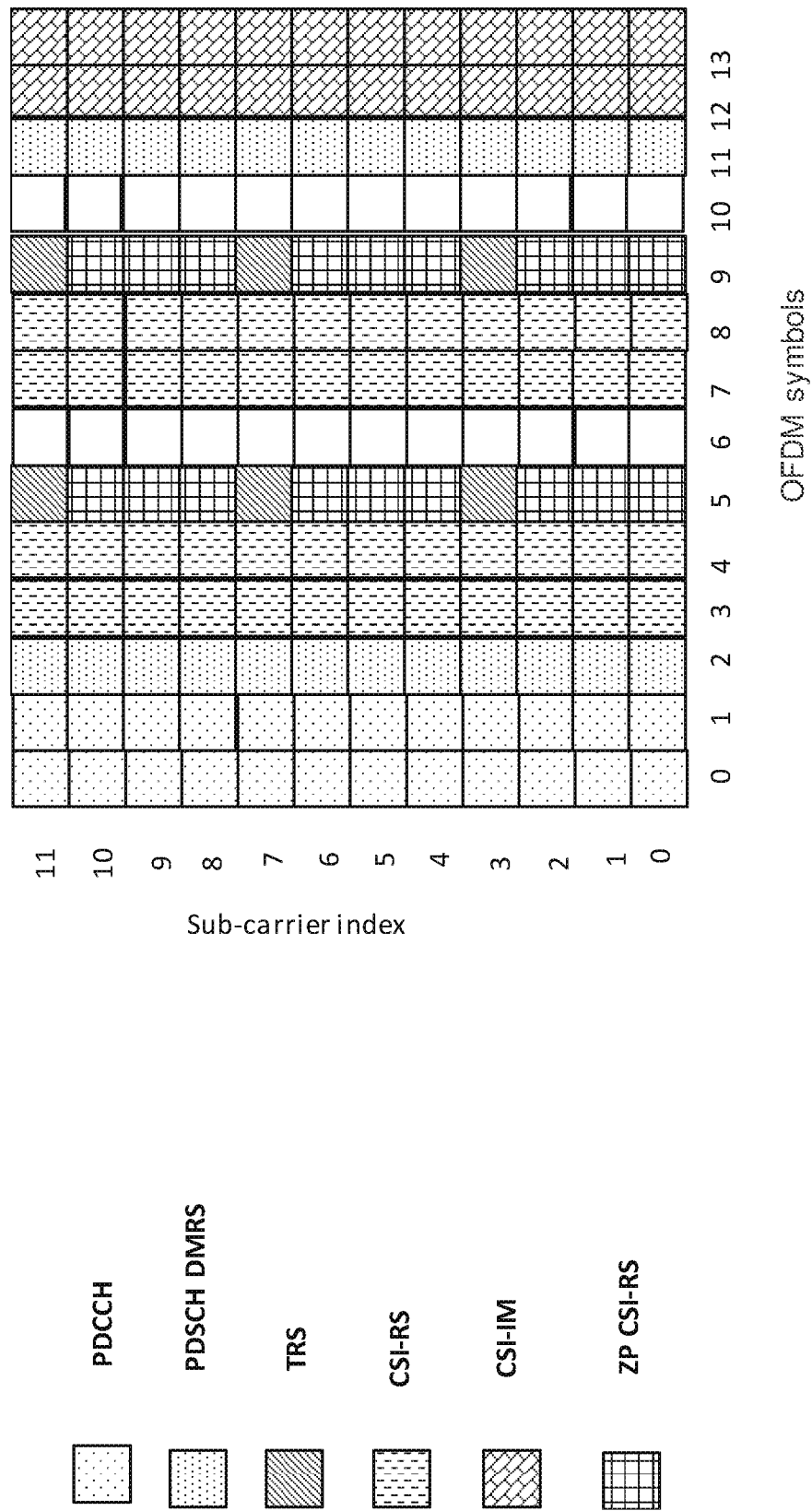
FIG. 17 is a block diagram of a ninth example resource partition according to one embodiment of the present disclosure.

FIG. 17 illustrates a ninth example resource partition of a subframe. In this example, resources are configured with a TRS power boost of 6 dB, where ZP CSI-RS is required. The TRS is mapped to OFDM symbols 5 and 9 at subcarriers 3, 7 and 11. ZP CSI-RS is mapped to OFDM symbols 5 and 9 at subcarriers 0, 4 and 8, as well as, subcarriers 1, 5 and 9 and subcarriers 2, 6 and 10, according to the embodiments discussed above for aligning TRSs with the same power levels.

Figure 18:
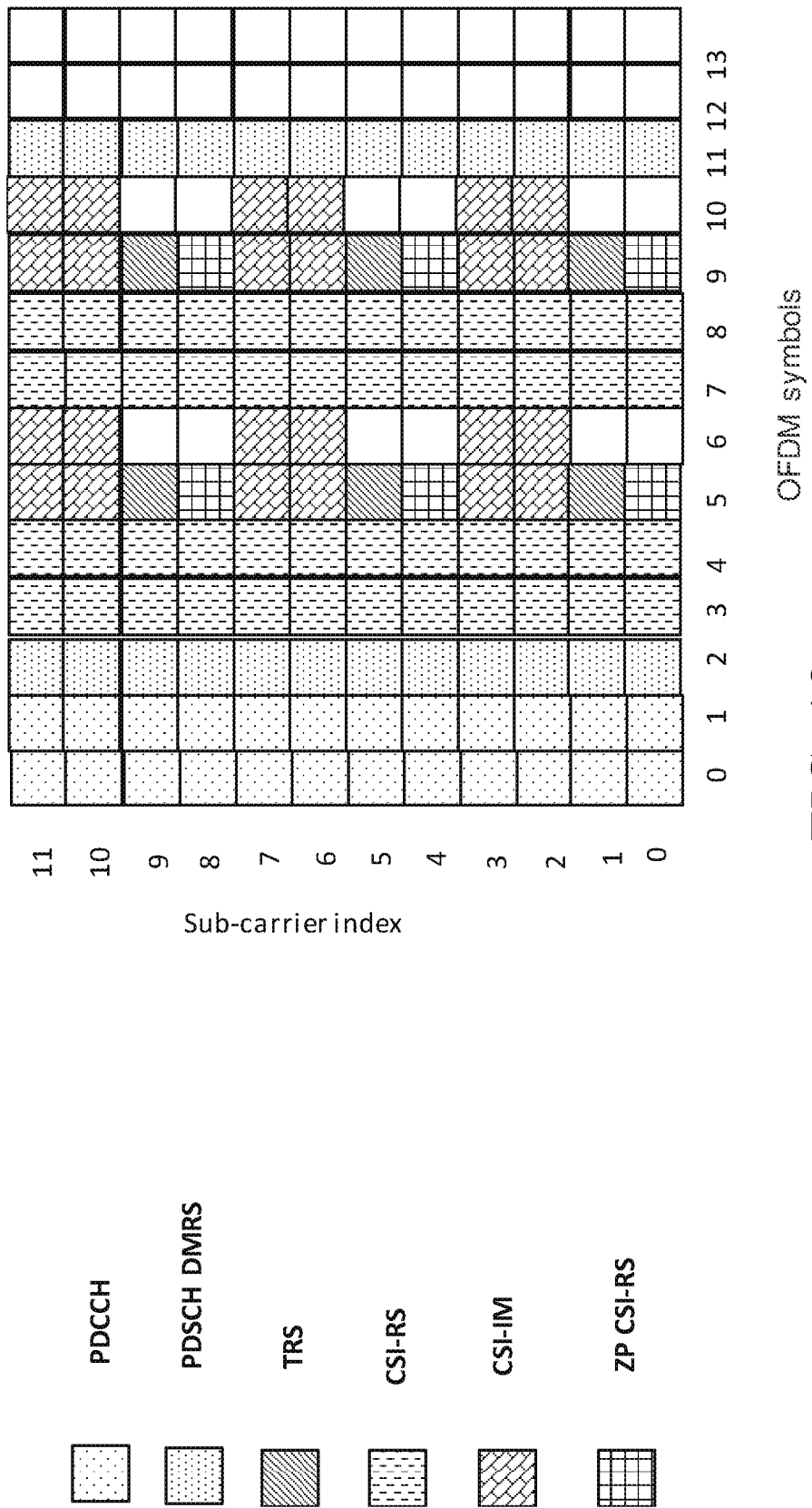
FIG. 18 is a block diagram of a tenth example resource partition according to one embodiment of the present disclosure.

FIG. 18 illustrates a tenth example resource partition of a subframe. In this example, resources are configured with a TRS power boost; however, the CSI-IM region does not include all subcarriers in an OFDM symbol. Thus, TRS and the CSI-IM REs can be in the same OFDM symbol together. In this example, the CSI-IM pattern is a 2×2 pattern (e.g., 2 consecutive OFDM symbols, with 2 adjacent REs on each the 2 consecutive symbols).

Figure 19:
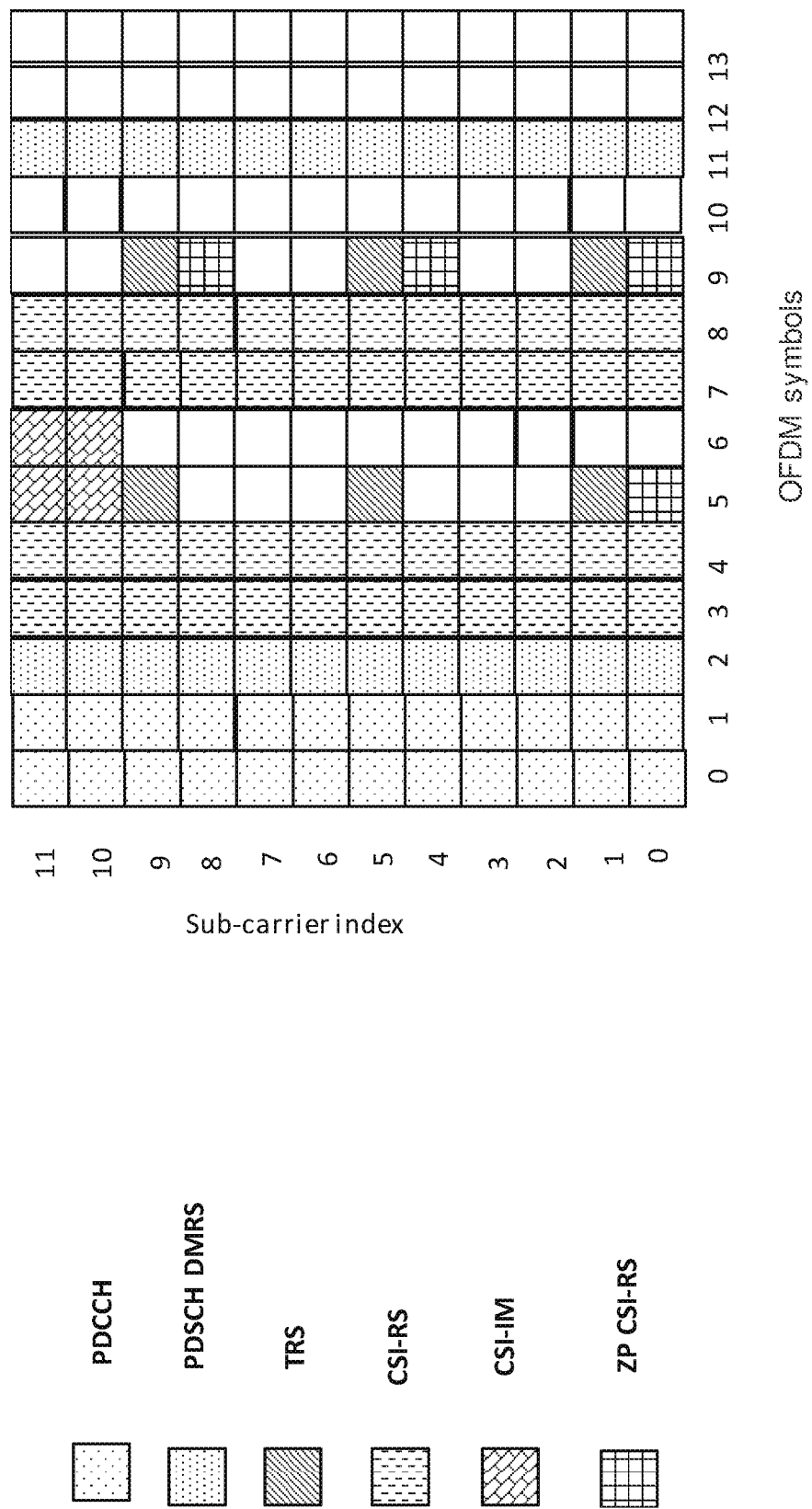
FIG. 19 is a block diagram of an eleventh example resource partition according to one embodiment of the present disclosure.

FIG. 19 illustrates an eleventh example resource partition of a subframe. In this example, resources are configured with a TRS power boost; however, less ZP CSI-RS resources are used, as compared to the example resource partition of FIG. 18. Specifically, the number of ZP CSI-RS REs is reduced by 2. One potential issue is the error in inter-cell interference measured by the WDs 22 in the cell. For example, power boosted TRS from neighbor cells may be seen as interference.

In other embodiments of the principles of this disclosure, there may be resource partition configurations other than those shown in FIGS. 9-19 that may advantageously reduce interference from neighboring cells.

It should be understood that the reference signal resources allocated and/or configured (e.g., by the resource allocation unit 32 of the network node 16) according to the embodiments and various arrangements discussed above may be used by e.g., the measurement unit 34 of the WD 22 to perform channel and/or interference measurements and to generate and send to the network node 16 corresponding CSI reports.

Accordingly, some embodiments in this disclosure provide solutions for performing resource mapping for CSI reference signals that may address the inter-cell interference problem to allow WDs to measure channel information more accurately. For example, in some embodiments, inter-cell interference error can be reduced by allocating resources for CSI-IM to avoid (or at least minimize) overlapping a cell's CSI-IM with a neighbor cell's NZP CSI-RS, including TRS and/or by allocating resources for CSI-IM to avoid (or at least minimize) overlapping the cell's CSI-IM with the neighbor cell's CSI-IM. Further, in some embodiments, improved channel estimation may be achieved by allocating NZP CSI-RS resources to align/overlap NZP CSI-RSs of neighboring cells, as compared to existing channel estimation techniques. In addition, in some embodiments, improved time and/or frequency synchronization may be achieved, as compared to existing time and frequency synchronization techniques, by TRS resource mapping that aligns TRSs of neighboring cells with the same power level, and uses different REs for TRSs of neighboring cells with different power levels. By reducing inter-cell interference error according to at least some of the principles in this disclosure, channel measurements may be more accurate and channel state information, such as CQI values, reported by the WD can be more accurate, which can improve user throughput as compared to existing CSI reference signal resource mapping techniques.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for serving a cell in a wireless network with at least one neighboring cell, the network node comprising processing circuitry configured to cause the network node to:
    allocate at least one resource for Channel State Information Interference Measurement, CSI-IM, within a predetermined IM region of a Resource Block, RB, of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell.

2. The network node according to claim 1, wherein the processing circuitry is further configured to:
    identify the at least one resource for the CSI-IM within the predetermined IM region of the RB of the cell based at least in part on an identifier of the cell.

3. The network node of claim 1, wherein the processing circuitry is further configured to cause the network node to:
    select at least one resource for Non-Zero Power, NZP, Channel State Information Reference Signal, CSI-RS, in a predetermined Reference Signal, RS, region of the RB of the cell, the predetermined RS region of the RB not overlapping with the predetermined IM region of the RB; and
    transmit the NZP CSI-RS on the selected at least one resource.

4. The network node of claim 1, wherein the predetermined IM region of the RB is a dedicated region for at least one CSI-IM resource, the dedicated region not comprising any NZP CSI-RS resources.

5. The network node of claim 1, wherein the predetermined RS region is a region of the RB configured for at least one CSI-RS resource, the predetermined RS region not comprising any CSI-IM resources.

6. The network node of claim 1, wherein the processing circuitry is further configured to cause the network node to:
 determine a slot offset for the CSI-IM based on a cell identifier, ID, of the cell being served by the network node.

7. The network node of claim 1, wherein the processing circuitry is further configured to cause the network node to:
 determine a period for the CSI-IM, the period for the CSI-IM being common to a group of cells, the group of cells including at least the cell and the neighboring cell.

8. The network node of claim 7, wherein the CSI-IM is mapped to the at least one resource of the predetermined IM region according to the determined period for the CSI-IM and the determined slot offset.

9. The network node of claim 1, wherein the CSI-IM is mapped to the at least one resource of the predetermined IM region according to a random selection algorithm.

10. The network node of claim 1, wherein the processing circuitry is further configured to cause the network node to:
 allocate at least one resource for Non-Zero Power, NZP, Channel State Information Reference Signal, CSI-RS, to at least partially overlap with at least one NZP CSI-RS resource of the neighboring cell.

11. The network node of claim 10, wherein the processing circuitry is further configured to cause the network node to:
 determine a period and a slot offset for the at least one NZP CSI-RS that is the same as a period and a slot offset for the at least one NPZ CSI-RS associated with the neighboring cell.

12. The network node of claim 1, wherein the processing circuitry is further configured to cause the network node to:
 transmit at least one Tracking Reference Signal, TRS, to at least partially overlap with at least one TRS of the neighboring cell.

13. The network node of claim 1, wherein the processing circuitry is further configured to cause the network node to:
 determine a period and a slot offset for at least one Tracking Reference Signal, TRS, that is the same as a period and a slot offset for at least one TRS associated with the neighboring cell; and
 transmit the at least one TRS according to the determined period and the determined slot offset.

14. The network node of claim 1, wherein the processing circuitry is further configured to cause the network node to:
 transmit at least one Tracking Reference Signal, TRS, in a fixed time domain location, the fixed time domain location being the same as a fixed time domain location of the neighboring cell.

15. The network node of claim 1, wherein the processing circuitry is further configured to cause the network node to:
 configure Tracking Reference Signal, TRS, resources in the RB of the cell by, for each TRS symbol in the RB, dividing a plurality of subcarriers into at least four sets of subcarriers, each of the at least four sets of subcarriers corresponding to a TRS power level that is different from a TRS power level of the other of the at least four sets of subcarriers; and
 wherein the at least four sets of subcarriers comprise:
  a first set of subcarriers that is assigned for transmitting TRS at a regular TRS power level;
  a second set of subcarriers that is assigned for transmitting TRS at a power level that is 3 decibels, dB, higher than the regular TRS power level;
  a third set of subcarriers that is assigned for transmitting TRS at a power level that is 4.8 dB higher than the regular TRS power level; and
  a fourth set of subcarriers that is assigned for transmitting TRS at a power level that is 6 dB higher than the regular TRS power level.

16. The network node of claim 15, wherein the processing circuitry is further configured to cause the network node to:
 transmit at least one TRS on one of the at least four sets of subcarriers; and
 if the at least one TRS is transmitted on one of the second set, the third set and the fourth set of subcarriers, transmit a Zero-Power, ZP, Channel State Information Reference Signal, CSI-RS, on at least the first set of subcarriers.

17. A method in a network node for serving a cell in a wireless network with at least one neighboring cell, the method comprising:
 allocating at least one resource for Channel State Information Interference Measurement, CSI-IM, within a predetermined IM region of a Resource Block, RB, of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell.

18. The method of claim 17, further comprising:
 identifying the at least one resource for the CSI-IM within the predetermined IM region of the RB of the cell based at least in part on an identifier of the cell.

19. The method of claim 17, further comprising:
 selecting at least one resource for Non-Zero Power, NZP, Channel State Information Reference Signal, CSI-RS, in a predetermined Reference Signal, RS, region of the RB of the cell, the predetermined RS region of the RB not overlapping with the predetermined IM region of the RB; and
 transmitting the NZP CSI-RS on the selected at least one resource.

20. The method of claim 19, wherein the predetermined RS region is a region of the RB of the cell configured for at least one CSI-RS resource, the predetermined RS region not comprising any CSI-IM resources.

21. The method of claim 17, wherein the predetermined IM region of the RB of the cell is a dedicated region for at least one CSI-IM resource, the dedicated region not comprising any NZP CSI-RS resources.

22. The method of claim 17, further comprising:
 determining a slot offset for the CSI-IM based on a cell identifier, ID, of the cell being served by the network node.

23. The method of claim 17, further comprising:
 determining a period for the CSI-IM, the period for the CSI-IM being common to a group of cells, the group of cells including at least the cell and the neighboring cell.

24. The method of claim 23, wherein the CSI-IM is mapped to the at least one resource of the predetermined IM region according to the determined period for the CSI-IM and the determined slot offset.

25. The method of claim 17, wherein the CSI-IM is mapped to the at least one resource of the predetermined IM region according to a random selection algorithm.

26. The method of claim 17, further comprising:
allocating at least one resource for Non-Zero Power, NZP, Channel State Information Reference Signal, CSI-RS, to at least partially overlap with at least one NZP CSI-RS resource of the neighboring cell.

27. The method of claim 26, further comprising:
determining a period and a slot offset for the at least one NZP CSI-RS that is the same as a period and a slot offset for the at least one NPZ CSI-RS associated with the neighboring cell.

28. The method of claim 17, further comprising:
transmitting at least one Tracking Reference Signal, TRS, to at least partially overlap with at least one TRS of the neighboring cell.

29. The method of claim 17, further comprising:
determining a period and a slot offset for at least one Tracking Reference Signal, TRS, that is the same as a period and a slot offset for at least one TRS associated with the neighboring cell; and
transmitting the at least one TRS according to the determined period and the determined slot offset.

30. The method of claim 17, further comprising:
transmitting at least one Tracking Reference Signal, TRS, in a fixed time domain location, the fixed time domain location being the same as a fixed time domain location of the neighboring cell.

31. The method of claim 17, further comprising
configuring Tracking Reference Signal, TRS, resources in the RB of the cell by, for each TRS symbol in the RB, dividing a plurality of subcarriers into at least four sets of subcarriers, each of the at least four sets of subcarriers corresponding to a TRS power level that is different from a TRS power level of the other of the at least four sets of subcarriers; and
wherein the at least four sets of subcarriers comprise:
a first set of subcarriers that is assigned for transmitting TRS at a regular TRS power level,
a second set of subcarriers that is assigned for transmitting TRS at a power level that is 3 decibels, dB, higher than the regular TRS power level,
a third set of subcarriers that is assigned for transmitting TRS at a power level that is 4.8 dB higher than the regular TRS power level, and
a fourth set of subcarriers that is assigned for transmitting TRS at a power level that is 6 dB higher than the regular TRS power level.

32. The method of claim 31, further comprising:
transmitting at least one TRS on one of the at least four sets of subcarriers; and
if the at least one TRS is transmitted on one of the second set, the third set and the fourth set of subcarriers, transmitting a Zero-Power, ZP, Channel State Information Reference Signal, CSI-RS, on at least the first set of subcarriers.

33. A computer readable storage medium comprising instructions which when executed on at least one processor of a network node perform a method for serving a cell in a wireless network with at least one neighboring cell, the method comprising:
allocating at least one resource for Channel State Information Interference Measurement, CSI-IM, within a predetermined IM region of a Resource Block, RB, of the cell, the predetermined IM region encompassing a plurality of resources of the RB of the cell, the allocated at least one resource being selected from among the plurality of resources of the IM region to reduce a likelihood that the allocated at least one resource overlaps with at least one resource allocated for CSI-IM in a neighboring cell as compared to allocating a common set of resources for CSI-IM in each neighboring cell, the predetermined IM region at least partially overlapping with a respective predetermined IM region of a RB of the neighboring cell, and the predetermined IM region of the cell not overlapping resources allocated for Non-Zero Power Channel State Information Reference Signal, NZP CSI-RS, of the neighboring cell.

* * * * *